(12) United States Patent
Nakashin

(10) Patent No.: US 10,565,891 B2
(45) Date of Patent: Feb. 18, 2020

(54) DISPLAY APPARATUS AND METHOD OF CONTROLLING DISPLAY APPARATUS

(71) Applicant: SEIKO EPSON CORPORATION, Tokyo (JP)

(72) Inventor: Yoshitaka Nakashin, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 130 days.

(21) Appl. No.: 15/688,243

(22) Filed: Aug. 28, 2017

(65) Prior Publication Data

US 2018/0061262 A1    Mar. 1, 2018

(30) Foreign Application Priority Data

Sep. 1, 2016   (JP) ................................. 2016-170492

(51) Int. Cl.
```
G06F 3/048      (2013.01)
G09B 7/02       (2006.01)
G06Q 50/20      (2012.01)
H04L 29/06      (2006.01)
H04L 29/08      (2006.01)
```

(52) U.S. Cl.
CPC .............. *G09B 7/02* (2013.01); *G06F 3/048* (2013.01); *G06Q 50/20* (2013.01); *H04L 65/403* (2013.01); *H04L 67/10* (2013.01)

(58) Field of Classification Search
CPC ....................................................... G06F 3/048
See application file for complete search history.

(56) References Cited

U.S. PATENT DOCUMENTS

| 2012/0212408 | A1* | 8/2012 | Iimura ...................... B43L 1/04 345/156 |
| 2012/0229470 | A1* | 9/2012 | Nagai .................. G06F 3/04883 345/440 |
| 2013/0176217 | A1* | 7/2013 | Inagaki ................... G06F 3/033 345/157 |
| 2015/0310756 | A1 | 10/2015 | Nakamura et al. |

FOREIGN PATENT DOCUMENTS

| JP | 2001-100627 A | 4/2001 |
| JP | 2004-212895 A | 7/2004 |
| JP | 2009-511964 A | 3/2009 |
| JP | 2012-226186 A | 11/2012 |
| JP | 2013-156788 A | 8/2013 |
| WO | 2007-041968 A1 | 4/2007 |

* cited by examiner

*Primary Examiner* — Roy P Rabindranath
(74) *Attorney, Agent, or Firm* — Oliff PLC

(57) ABSTRACT

A display apparatus includes: a display unit that displays a first image on a display surface; a control unit that causes the display unit to display the first image on the display surface; an object processing unit that generates a display object; and a storage unit. The control unit generates a second image by combining the display object generated by the object processing unit with the first image displayed on the display surface, and causes the display unit to display the second image. The storage unit stores first display data which represents the first image displayed on the display unit. The storage unit also stores second display data which represents the second image in association with the first display data.

11 Claims, 13 Drawing Sheets

DISPLAY APPARATUS AND METHOD OF CONTROLLING DISPLAY APPARATUS

CROSS-REFERENCE

The entire disclosure of Japanese Patent Application No. 2016-170492, filed Sep. 1, 2016 is expressly incorporated by reference herein.

BACKGROUND

1. Technical Field

The present invention relates to a display apparatus and a method of controlling the display apparatus.

2. Related Art

In the related art, there are known systems in which content of textbooks is displayed through operations of teachers on display apparatuses such as electronic blackboards displaying educational materials and students are caused to input answers to questions (for example, see JP-A-2012-226186). In the system of JP-A-2012-226186, content of a textbook designated by a teacher is displayed on an electronic blackboard, a question is displayed on the electronic blackboard through an operation by the teacher, and an answer of a student input into a student's terminal is displayed.

JP-A-2012-226186 discloses an example in which a designated page in the textbook that has a plurality of pages is displayed. However, the size of one page in the textbook is larger than a range which can be displayed by a display apparatus in many cases. For example, when a display region displayed by a display apparatus is horizontally long and a textbook is a vertically long document, there is a possibility of one entire page of the textbook not being all displayable at a time. In addition, even when content data other than textbooks is displayed, the same problem can arise. In this case, a part of the content data is cut and displayed. However, a display state of the content data displayed once is desired to be reproduced, it is necessary to specify a displayed range in the content data.

SUMMARY

An advantage of some aspects of the invention is to display content data which has content exceeding a range displayed by a display apparatus and subsequently to easily reproduce a display state of the content data.

An aspect of the invention is directed to a display apparatus including: a display unit that displays a first image on a display surface; a control unit that causes the display unit to display the first image on the display surface; an object processing unit that generates a display object; and a storage unit. The control unit generates a second image by combining the display object generated by the object processing unit with the first image displayed on the display surface and causes the display unit to display the second image. The storage unit stores first display data which represents the first image displayed on the display unit. The storage unit also stores second display data which represents the second image in association with the first display data.

According to the aspect of the invention, the display apparatus stores the first image displayed as the first display data and stores the second image displayed in such a manner that the display object is combined with the first image as the second display data. Thus, the display apparatus can easily reproduce a state in which first image is displayed. In addition, the display apparatus can easily reproduce a state in which the display object is combined and displayed and a state in which the display object is not combined.

In the display apparatus according to the aspect of the invention, the control unit may generate the first display data and the second display data corresponding to an image equivalent to one surface and displayed on the display surface by the display unit.

According to the aspect of the invention with this configuration, the display state of the first image can easily be reproduced using data of an image equivalent to one surface displayed on the display surface by the display apparatus.

In the display apparatus according to the aspect of the invention, when the control unit causes the display unit to display the first image, the control unit may generate the first display data and store the first display data in the storage unit.

According to the aspect of the invention with this configuration, since the display apparatus stores the first display data in a state before the display of the display object, the display apparatus can easily reproduce the display state of the first image. In addition, in regard to the first image displayed by the display apparatus, the first display data can be stored without omission.

In the display apparatus according to the aspect of the invention, when the control unit combines the display object generated by the object processing unit with the first image and causes the display unit to display the display object, the control unit may generate the first display data and the second display data and store the first display data and the second display data in the storage unit.

According to the aspect of the invention with this configuration, when the display object is combined with the first image, the display apparatus generates the first display data in the state in which the display object is not combined and the second display data in the state in which the display object is combined. Therefore, in regard to the first image displayed by the display apparatus, the first display data and the second display data can be stored without omission, and thus the display state of the first image can easily be reproduced.

In the display apparatus according to the aspect of the invention, when an instruction not to display the display object generated by the object processing unit is input, the control unit may cause the display unit to display an image based on the first display data stored in the storage unit.

According to the aspect of the invention with this configuration, the display apparatus can efficiently perform a process of not displaying the display object using the first display data.

In the display apparatus according to the aspect of the invention, the storage unit stores a plurality of pieces of the second display data in association with one piece of first display data.

According to the aspect of the invention with this configuration, for example, the display apparatus can store the plurality of pieces of second display data corresponding to a plurality of different display objects and thus can reproduce display states in which the plurality of different display objects are switched and combined in regard to one piece of first display data.

In the display apparatus according to the aspect of the invention, in a state in which the control unit causes the display unit to display an image based on the first display data or the second display data stored in the storage unit, the control unit may combine the image based on the first display data or the second display data as the display object and cause the display unit to display the display object.

According to the aspect of the invention with this configuration, the display apparatus can combine the first image data and the second image data with other images as display objects and display the images. Thus, it is possible to reproduce the display state of the first image in various forms.

In the display apparatus according to the aspect of the invention, the control unit may cut a part of content data and cause the display unit to display the first image based on the cut content data.

According to the aspect of the invention with this configuration, it is possible to easily reproduce a display state in which the part of the content data is displayed by the display apparatus. Therefore, when content of the content data is larger than a range which can be displayed on the display surface, the display state of the content data can be reproduced without performing a work of specifying a displayed range.

The display apparatus according to the aspect of the invention may further include a detection unit that detects an operation. The object processing unit may generate the display object in response to the operation detected by the detection unit.

According to the aspect of the invention with this configuration, it is possible to generate the display object in response to the operation and combine the display object with the first image to display the display object.

The display apparatus according to the aspect of the invention may further include a position detection unit that detects a position instruction operation. The detection unit may acquire an instruction position of the position instruction operation detected by the position detection unit. The object processing unit may generate the display object based on the instruction position acquired by the detection unit.

According to the aspect of the invention with this configuration, it is possible to generate the display object in accordance with the position instruction operation and combine the display object with the first image to display the display object.

In the display apparatus according to the aspect of the invention, the display unit may include a projection unit displaying an image by projecting image light to the display surface. The position detection unit may detect the position instruction operation in a projection region to which the projection unit projects the image light.

According to the aspect of the invention with this configuration, a projector projecting image light to the display surface can display the first image, detect the position instruction operation in a projection region of the projector, and generate and display the display object. In addition, it is possible to easily reproduce the display state of the first image displayed by the projector.

Another aspect of the invention is directed to a method of controlling a display apparatus including a display unit that displays an image on a display surface. The method includes: displaying a first image on the display surface by the display unit; storing first display data which represents the first image displayed by the display unit in a storage unit; generating a display object; generating a second image by combining the generated display object with the first image displayed on the display surface; displaying the second image; and storing second display data which represents the second image in association with the first display data in the storage unit.

The display apparatus to which the method of controlling the display apparatus according to the aspect of the invention is applied stores the first image displayed as the first display data and stores the second image displayed in such a manner that the display object is combined with the first image displayed as the second display data. Thus, the display apparatus can easily reproduce a state in which the first image is displayed. In addition, the display apparatus can easily reproduce a state in which the display object is combined and displayed and a state in which the display object is not combined.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
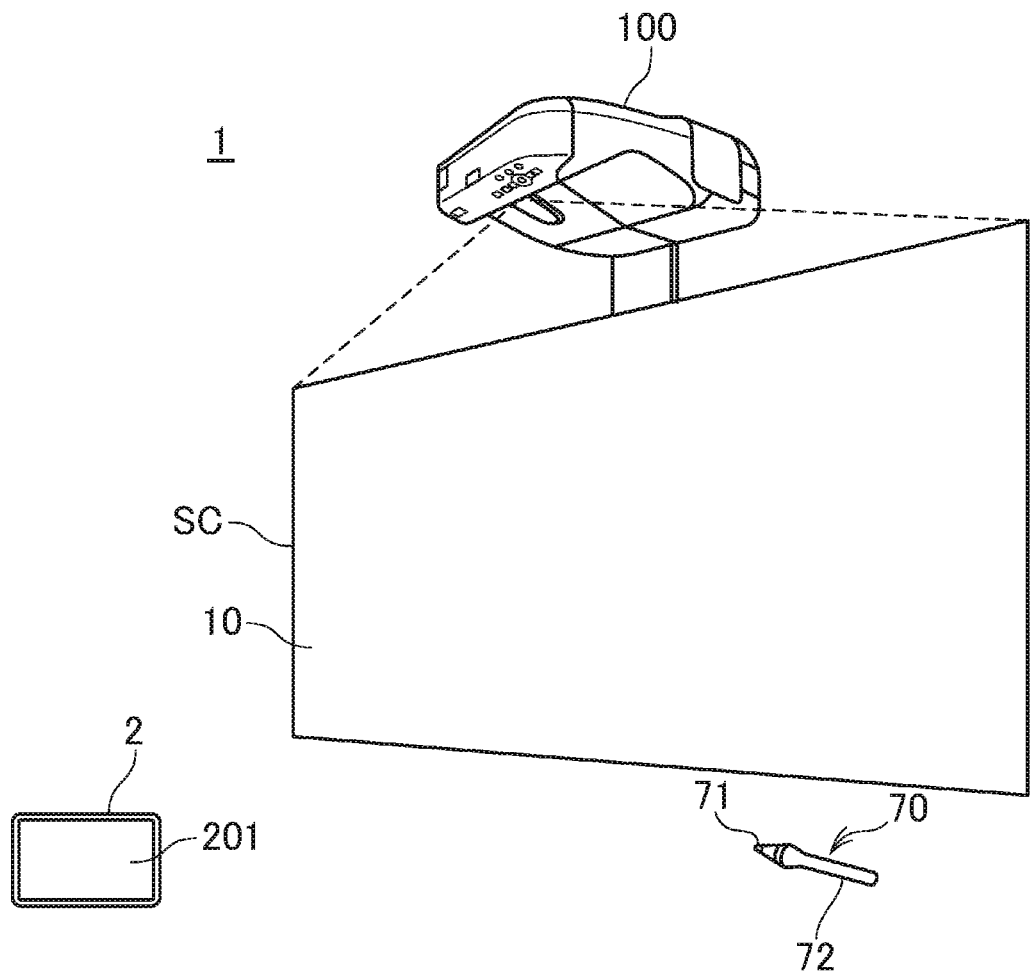
FIG. 1 is a diagram illustrating a configuration and an installation state of a display system.

FIG. 1 is a diagram illustrating a configuration and an installation state of a display system 1.

The display system 1 includes a projector 100 as a specific form of a display apparatus. In the display system 1, tablets 2 and 3 are connected to the projector 100 (display apparatus) by wireless communication lines so that data communication can be performed. The number of tablets 2 and 3 included in the display system 1 is not limited. In the embodiment, an example in which one tablet 2 and a plurality of tablets 3 are connected to the projector 100 will be described.

The tablets 2 and 3 can be assigned to users who have different roles. For example, when the display system 1 is used in an education place, a user (for example, a teacher)

who performs education uses the tablet 2 and users (for example, students) who get education use the tablets 3. The user operating the tablet 2 or another user operates the projector 100. In the embodiment, the user operating the tablet 2 operates the projector 100 using an instructor 70.

FIG. 1 illustrates an installation state of the projector 100.

The projector 100 is installed above or obliquely above a screen SC and projects an image toward the screen SC (display surface). The screen SC is a plate or a curtain fixed to a wall surface or erect to a surface of a floor. The invention is not limited to this example and the wall surface can also be used as the screen SC. In this case, the projector 100 may be mounted on an upper portion of the wall surface used as the screen SC.

The projector 100 may be connected to an image supply apparatus that outputs an image. The image supply apparatus is a server apparatus, a personal computer (PC), or a media reproduction apparatus that reproduces a digital versatile disk (DVD), a Blu-ray disc, or the like. In this case, the projector 100 projects an image to the screen SC based on an analog image signal or digital image data output by the image supply apparatus. The projector 100 may read image data stored in a storage unit 60 (see FIG. 3) or an externally connected storage medium and may display an image on the screen SC based on the image data.

The projector 100 projects an image to a projection region 10 of the screen SC. The size of the projection region 10 can be adjusted by a zoom function or the like of the projector 100. In the embodiment, an example in which an image is projected to the projection region 10 with the same size as the screen SC will be described. The projection region 10 may be smaller than the screen SC.

The projector 100 detects an operation by the instructor 70. The instructor 70 is a pen-type input device which is gripped with a hand by the user. The user grips a shaft portion 72 of the instructor 70 with his or her hand and performs an operation of bringing the front end portion 71 of the instructor 70 into contact with the screen SC. For example, the user can perform an operation of bringing the front end portion 71 into contact with the screen SC for a given time. In this case, the projector 100 detects a position at which the front end portion 71 is brought into contact with the screen SC as an instruction position. The user can perform an operation of moving the front end portion 71 while bringing the front end portion 71 into contact with the screen SC. In this case, the projector 100 detects a trajectory in which the front end portion 71 is moved on the screen SC.

The projector 100 detects an operation performed using the instructor 70 and reflects the detected operation in a display image on the screen SC. For example, the projector 100 detects an instruction position instructed with the front end portion 71 and realizes a graphical user interface (GUI) operation of performing a function of the projector 100 based on the coordinates of the instruction position. The projector 100 generates and displays a display object such as a letter or a figure along a trajectory of the instruction position of the front end portion 71. A function of generating and displaying a display object is referred to as a drawing function.

The tablet 2 includes a touch panel 201 on its body with a flat plate shape. The tablet 3 includes a touch panel 301 in its body with a flat plate shape. The touch panels 201 and 301 have a configuration in which a display screen with a liquid crystal display panel or an organic EL panel and a touch panel detecting a touch operation are superimposed. The tablet 2 detects that a finger or a hand of the user is touched on the touch panel 201. The tablet 3 detects that a finger or a hand of the user is touched on the touch panel 301.

Figure 2:
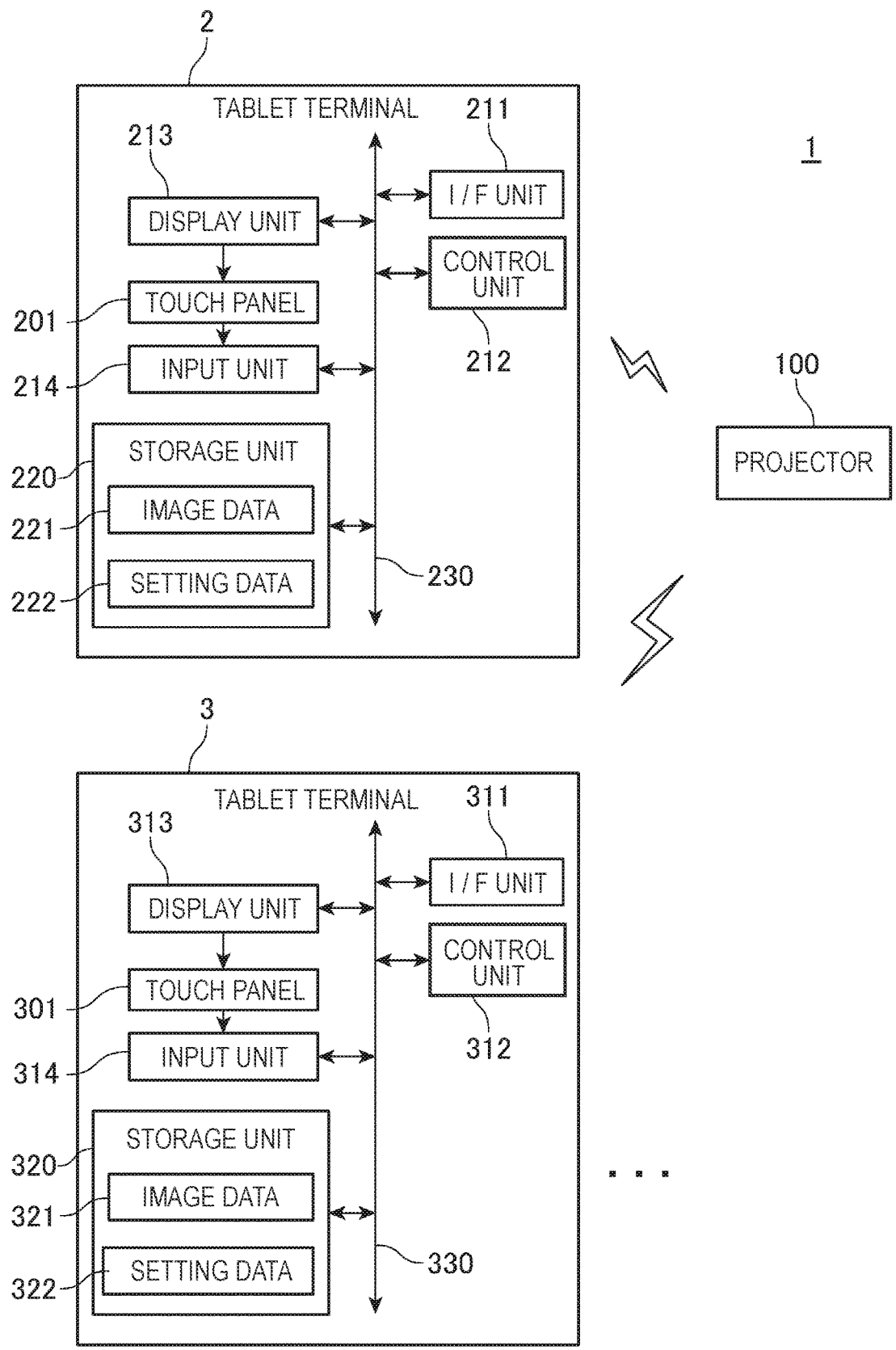
FIG. 2 is a block diagram illustrating apparatuses connected to a projector.

FIG. 2 is a functional block diagram illustrating the tablets 2 and 3.

The tablet 2 includes an interface (I/F) unit 211. The interface unit 211 is connected to the projector 100.

The interface unit 211 may be a wired communication interface that includes a connector for wired connection wired-connected to an external apparatus and an interface circuit corresponding to this connector. Specifically, the interface unit 211 may be an interface corresponding to a wired LAN, IEEE 1394, a USB, a mobile high-definition link (MHL: registered trademark), a high-definition multimedia interface (HDMI: registered trademark), or the like.

The interface unit 211 may be a wireless communication interface that includes an antenna, a radio frequency (RF) circuit, and a modulation/demodulation circuit. For example, the interface unit 211 may be an interface corresponding to a wireless LAN (including WiFi (registered trademark)), Bluetooth (registered trademark), Miracast (registered trademark), or the like.

The interface unit 211 according to the embodiment is a wireless communication interface capable of performing wireless LAN communication.

The tablet 2 includes a control unit 212, a display unit 213, an input unit 214, and a storage unit 220. These units and the interface unit 211 are connected to each other by a bus 230. The control unit 212 includes a central processing unit (CPU), a random access memory (RAM), and a read-only memory (ROM) (none of which is illustrated). The control unit 212 causes the CPU to execute a control program stored in the ROM and a control program stored in the storage unit 220 and controls each unit of the tablet 2.

The display unit 213 and the input unit 214 are connected to the touch panel 201. The display unit 213 displays various screens on the touch panel 201 under the control of the control unit 212. The input unit 214 detects a touch operation on the touch panel 201 and outputs coordinate data indicating the position of the detected operation to the control unit 212.

The storage unit 220 stores a program to be executed by the control unit 212 and various kinds of data in a nonvolatile manner. The storage unit 220 stores image data 221 and setting data 222.

The image data 221 is display image data including an image or a letter to be displayed on the touch panel 201 by the display unit 213. The control unit 212 can cause the display unit 213 to display an image based on the image data 221. When image data transmitted by the projector 100 is received by the interface unit 211, the control unit 212 stores the image data as the image data 221 and displays an image based on the image data 221.

The setting data 222 includes information set in advance in regard to an operation of the tablet 2. For example, the setting data 222 includes information regarding communication setting of the interface unit 211. Specifically, a media access control (MAC) address of the tablet 2, an Internet protocol (IP) address, a network name, and a service set identifier (SSID) may be included. An SSID of an apparatus to which the interface unit 211 is connected, a type of security setting, a password or a passkey, and a terminal name may be included. For example, the security setting can be selected from a wired equivalent privacy (WEP), Wi-Fi protected access (WPA), and the like. The setting data 222 may include information regarding communication setting of the interface unit 211 or may include information regarding communication setting of a communication partner apparatus (the projector 100 or the like).

The control unit 212 performs wireless data communication with the projector 100 through the interface unit 211 with reference to the setting data 222.

The control unit 212 has a function of transmitting the image data 221 to the projector 100. When this function is performed, the control unit 212 reads the image data 221 from the storage unit 220 and transmits the image data 221 to the interface unit 211 in response to an operation detected on the touch panel 201. When image data is received from the projector 100 by the interface unit 211, the control unit 212 stores the received image data as the image data 221.

When a touch operation is detected on the touch panel 201, the control unit 212 has a function of transmitting data indicating an operation position of the detected touch operation to the projector 100. When this function is performed, the control unit 212 transmits the operation position detected on the touch panel 201, for example, as coordinate data of a coordinate system virtually set on the touch panel 201. The operation position detected by the control unit 212 is a relative position to an entire region in which the position detection is performed on the touch panel 201. The control unit 212 transmits the coordinate data indicating a relative position of the detection position to the projector 100 through the interface unit 211.

The tablet 3 has the same configuration as the tablet 2. That is, the tablet 3 includes an interface (I/F) unit 311 connected to an external apparatus such as the projector 100. The interface unit 311 has the same configuration as the interface unit 211.

The tablet 3 includes a control unit 212, a display unit 313, an input unit 314, and a storage unit 320. These units and the interface unit 311 are connected to each other by a bus 330 so that data communication is possible. The control unit 312 includes a CPU, a RAM, and a ROM (none of which is illustrated) and causes the CPU to execute a control program stored in the ROM and a control program stored in the storage unit 320 and controls each unit of the tablet 3.

The display unit 313 and the input unit 314 are connected to the touch panel 301. The display unit 313 displays various screens on the touch panel 301 under the control of the control unit 312. The input unit 314 detects a touch operation on the touch panel 301 and outputs coordinate data indicating the position of the detected operation to the control unit 312.

The storage unit 320 stores a program to be executed by the control unit 312 and various kinds of data in a nonvolatile manner. The storage unit 320 stores image data 321 and setting data 322.

The image data 321 is display image data including an image or a letter to be displayed on the touch panel 301. The control unit 312 can cause the display unit 313 to display an image based on the image data 321. When image data transmitted by the projector 100 is received by the interface unit 311, the control unit 312 stores the image data as the image data 321 and displays an image based on the image data 321.

The setting data 322 includes information set in advance in regard to an operation of the tablet 3. For example, the setting data 322 includes information regarding communication setting of the interface unit 311. Specifically, a MAC address of the tablet 3, an IP address, a network name, and an SSID may be included. An SSID of an apparatus to which the interface unit 311 is connected, a type of security setting, a password or a passkey, and a terminal name may be included. For example, the security setting can be selected from a WEP, WPA, and the like. The setting data 322 may include information regarding communication setting of the interface unit 311 or may include information regarding communication setting of a communication partner apparatus (the projector 100 or the like).

The control unit 312 establishes wireless communication with the projector 100 with reference to the setting data 322 and performs data communication wirelessly with the projector 100. When the control unit 312 transmits the image data 321 to the projector 100, the projector 100 receives the image data 321 and projects an image based on the image data 321. The control unit 312 can also cause the display unit 313 to display the image based on the image data 321 to be transmitted to the projector 100.

When a touch operation is detected on the touch panel 301, the control unit 312 has a function of transmitting data indicating the operation position of the detected touch operation to the projector 100. When this function is performed, the control unit 312 transmits the operation position detected on the touch panel 301, for example, as coordinate data of a coordinate system virtually set on the touch panel 301. The operation position detected by the control unit 312 is a relative position to an entire region in which the position detection is performed on the touch panel 301. The control unit 312 transmits the coordinate data indicating a relative position of the detection position to the projector 100 through the interface unit 311.

Figure 3:
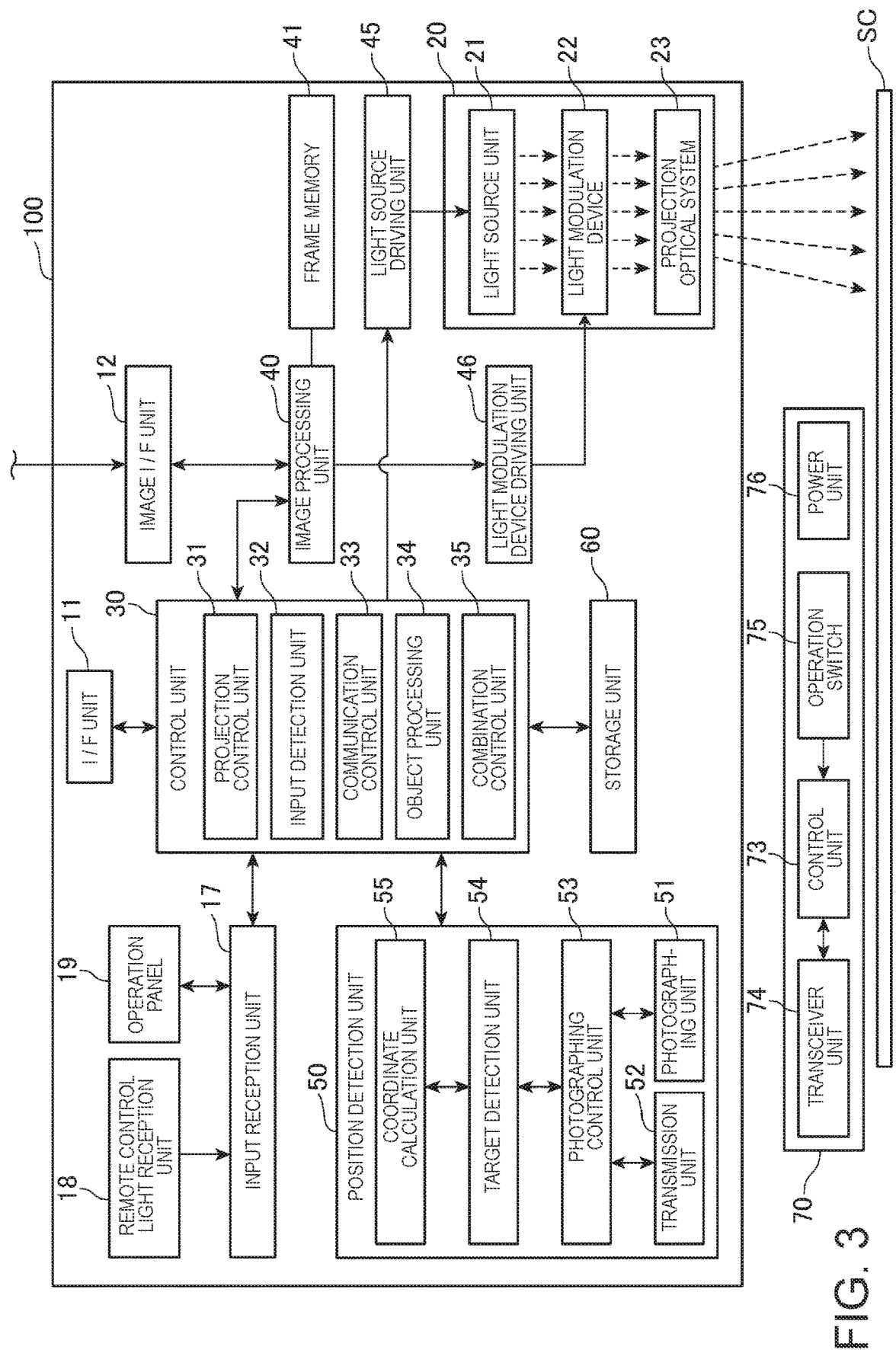
FIG. 3 is a block diagram illustrating the projector and an instructor.

FIG. 3 is a functional block diagram illustrating the projector 100. In FIG. 3, the functional block diagram is illustrated along with a functional block of the instructor 70.

The projector 100 includes an interface (I/F) unit 11 and an image interface (I/F) unit 12. The interface unit 11 and the image interface unit 12 are interfaces connected to an external apparatus. The interface unit 11 may be a wired communication interface that includes a connector for wired connection wired-connected to an external apparatus and an interface circuit corresponding to the connector. Specifically, an interface in conformity to a wired LAN, IEEE 1394, or a USB can be exemplified. The image interface unit 12 may be the same communication interface as the interface unit 11 or may be an image input interface. For example, a digital visual interface (DVI), a D terminal, an S terminal, a composite, or a D-sub interface may be used. The image interface unit 12 may include an interface to which audio data is input.

The interface unit 11 and the image interface unit 12 may be wireless communication interfaces that each include an antenna, an RF circuit, and a modulation/demodulation circuit. For example, these interface unit may be an interface corresponding to a wireless LAN (including WiFi), Bluetooth, Miracast, or the like.

The interface unit 11 transmits and receives various kinds of data to and from an external apparatus under the control of the control unit 30 to be described below. The interface unit 11 inputs and outputs data regarding projection of an image and data or the like for setting an operation of the projector 100.

The interface unit 11 according to the embodiment includes a wireless LAN interface and performs wireless data communication with the tablets 2 and 3 under the control of the control unit 30. The interface unit 11 is connected to a communication line and can communicate with an external apparatus (a server) (not illustrated).

For example, the image interface unit 12 is connected to the above-described image supply apparatus so that digital image data or an analog image signal is input. The projector 100 can project an image based on the digital image data or the analog image signal input to the image interface unit 12. In the embodiment, the digital image data is input to the image interface unit 12.

The projector 100 includes a projection unit 20 (a display unit) that forms an optical image. The projection unit 20 includes a light source unit 21, a light modulation device 22, and a projection optical system 23. The light source unit 21 includes a light source formed of a xenon lamp, an ultra-high pressure mercury lamp, a light emitting diode (LED), or a laser light source. The light source unit 21 may include a reflector and an auxiliary reflector that guide light emitted by the light source to the light modulation device 22. Further, the projector 100 may include a lens group (not illustrated) for improving optical characteristics of projected light, a polarizing plate, or a modulated light element that reduces an amount of light emitted by the light source along a route reaching the light modulation device 22.

The light modulation device 22 includes three transmissive liquid crystal panels corresponding to, for example, the three primary colors of RGB and modulates light transmitted through the liquid crystal panels to generate image light. Light from the light source unit 21 is separated into three pieces of color light of RGB and the pieces of color light are incident on the corresponding liquid crystal panels. The pieces of color light that pass through the liquid crystal panels and are modulated are combined by a combination optical system such as a cross dichroic prism to exit to the projection optical system 23.

The projection optical system 23 guides the image light modulated by the light modulation device 22 in the direction of the screen SC and forms an image on the screen SC. The projection optical system 23 may include a zoom mechanism that expands or reduces a display image on the screen SC or a focus adjustment mechanism that adjusts a focus. When the projector 100 is of a short focus type, a concave mirror that reflects the image light toward the screen SC may be included in the projection optical system 23.

The projection unit 20 is connected to a light source driving unit 45 that turns on the light source unit 21 under the control of the control unit 30 and a light modulation device driving unit 46 that operates the light modulation device 22 under the control of the control unit 30. The light source driving unit 45 may have a function of adjusting an amount of light of the light source unit 21 by switching turning on and turning off the light source unit 21.

The projector 100 includes an image processing system that processes an image to be projected by the projection unit 20. The image processing system includes the control unit 30 that controls the projector 100, the storage unit 60, an input reception unit 17, an image processing unit 40, the light source driving unit 45, and the light modulation device driving unit 46. A frame memory 41 is connected to the image processing unit 40 and a position detection unit 50 is connected to the control unit 30. These units may be included in the image processing system.

The control unit 30 includes a CPU, a ROM, and a RAM (not illustrated) and controls the projector 100 by causing the CPU to execute a basic control program stored in the ROM. The CPU of the control unit 30 executes a control program 61 stored in the storage unit 60 (see FIG. 4) and processes data such as setting data 62 and content data 63 stored in the storage unit 60.

The storage unit 60 stores a program to be executed by the CPU included in the control unit 30 and various kinds of data to be processed by the control unit 30 in a nonvolatile manner.

Figure 4:
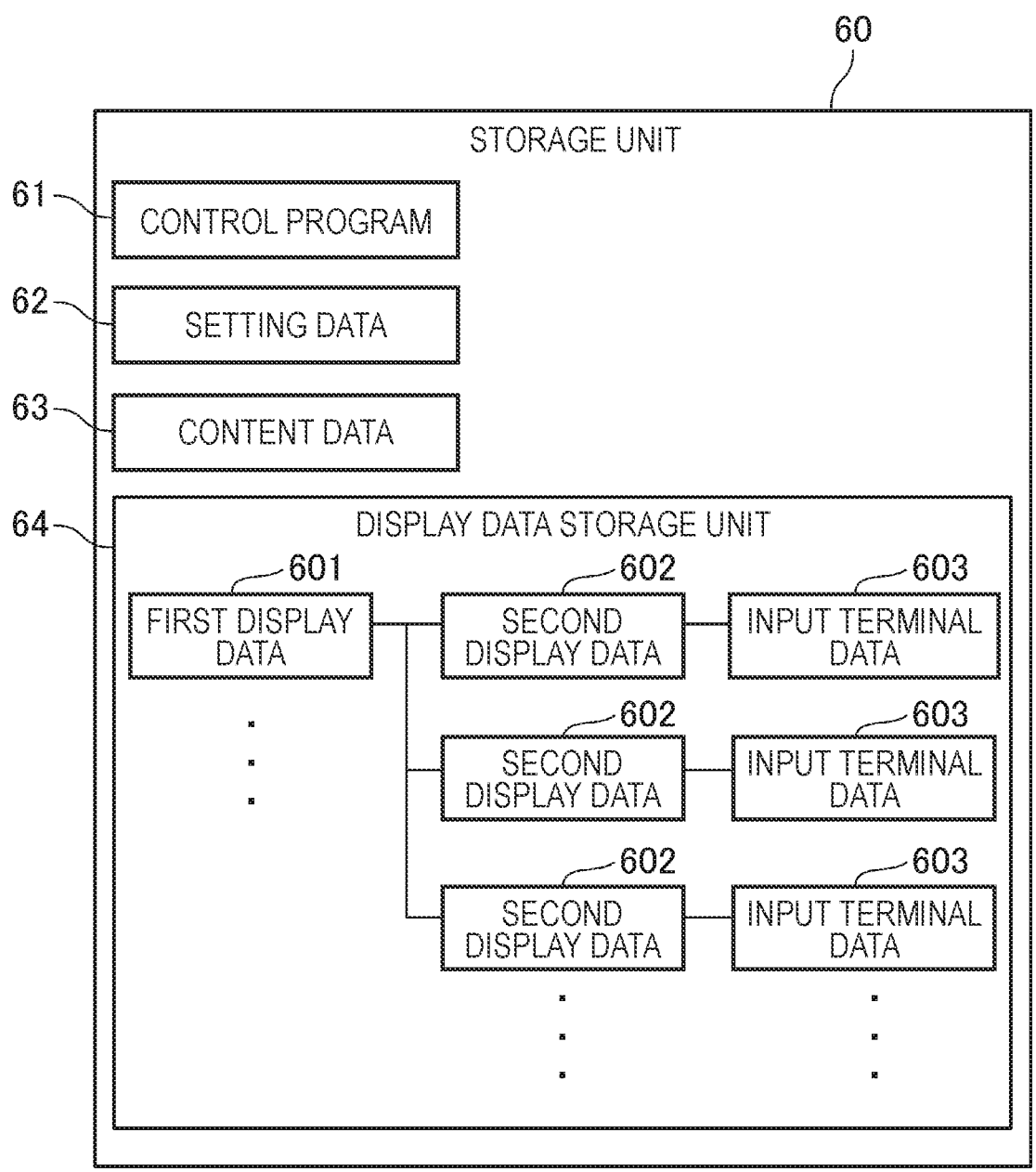
FIG. 4 is a schematic diagram illustrating a configuration of a storage unit and data stored in the storage unit.

FIG. 4 is a schematic diagram illustrating a configuration of the storage unit 60 and data stored in the storage unit 60.

The storage unit 60 according to the embodiment stores, for example, the control program 61, the setting data 62, and the content data 63. A display data storage unit 64 is formed in the storage unit 60.

The control program 61 is a program executed by the control unit 30.

The setting data 62 includes information set in advance in regard to an operation of the projector 100. For example, the setting data 62 includes information regarding communication setting of the interface unit 11. Specifically, the MAC address of the interface unit 11, an IP address, a network name, and an SSID may be included. The SSID of apparatus (including the tablet 2 or 3) to which the interface unit 11 is connected, a type of security setting, a password or a passkey, and a terminal name may be included. For example, the security setting can be selected from a WEP, WPA, and the like. The setting data 62 may include information of identifying the tablets 2 and 3 connected to the interface unit 11. For example, unique IDs or the like assigned in advance to the tablets 2 and 3 may be included. As will be described below, the setting data 62 may include information regarding a detection resolution of a touch operation on the touch panel 201 of the tablet 2 and a detection resolution of a touch operation on the touch panel 301 of the tablet 3. The setting data 62 may include information regarding an apparatus connected to the image interface unit 12.

The content data 63 is image data such as still image data and moving image (video) data. The control unit 30 can cause the projection unit 20 to project an image based on the content data 63. The content data 63 may include a plurality of pieces of image data. The control unit 30 may acquire image data input to the interface unit 11 or the image interface unit 12 and store the image data as the content data 63 in the storage unit 60. Each piece of image data included in the content data 63 may be data to which audio data is added. The content data 63 may include the image data and the audio data in association therewith.

The display data storage unit 64 is a virtual storage unit installed in a storage region of the storage unit 60. The display data storage unit 64 may be a different storage unit from the storage unit 60.

The display data storage unit 64 stores first display data 601 and second display data 602 in association therewith. The first display data 601 is image data of a image to be projected (displayed) by the projection unit 20 under the control of the control unit 30. The second display data 602 is data of an image in which a display object generated by the object processing unit 34 to be described below is combined in a state in which the projection unit 20 projects the image corresponding to the first display data 601. The second display data 602 is stored in association with input terminal data 603. The first display data 601, the second display data 602, and the input terminal data 603 will be described below.

The image processing unit 40 processes the image data under the control of the control unit 30 and outputs an image signal to the light modulation device driving unit 46. Processes performed by the image processing unit 40 are a process of discriminating a 3D (stereoscopic) image from a 2D (planar) image, a resolution conversion process, a frame rate conversion process, a distortion correction process, a digital zoom process, a color tone correction process, and a luminance correction process. The image processing unit 40 performs a process designated by the control unit 30 and performs a process using a parameter input from the control unit 30, as necessary. A plurality of processes among the foregoing processes can also be combined to be performed, of course.

The image processing unit 40 is connected to the frame memory 41. The image processing unit 40 processes image data input to the image interface unit 12 as input image data. When image data input to the interface unit 11 is transmitted to the image processing unit 40 by the control unit 30, the image processing unit 40 processes the image data transmitted by the control unit 30 as input image data. The image data input to the interface unit 11 includes, for example, image data acquired from an external apparatus when the projector 100 communicates with the external apparatus under the control of the control unit 30. Here, the external apparatus may be the tablet 2 or 3, a document camera (not illustrated) wired-connected to the interface unit 11, or a server (not illustrated) connected to the interface unit 11 via a communication line. When the content data 63 stored in the storage unit 60 is transmitted to the image processing unit 40 by the control unit 30, the image processing unit 40 processes the image data transmitted by the control unit 30 as input image data.

The input image data processed by the image processing unit 40 is equivalent to content data according to the invention. The image data input from the interface unit 11, the image data input from the image interface unit 12, and the content data 63 transmitted by the control unit 30 are all equivalent to the foregoing content data.

The image processing unit 40 loads the input image data on the frame memory 41 and draws an image on the frame memory 41. The image processing unit 40 performs each of the foregoing processes on the image loaded on the frame memory 41.

The image processing unit 40 reads the processed image data from the frame memory 41, generates image signals of R, G, and B corresponding to the image data, and outputs the image signals to the light modulation device driving unit 46. For example, when the image data input to the image interface unit 12 is moving image data configured with consecutive frames, the image processing unit 40 loads each frame on the frame memory 41. In this case, the image processing unit 40 sequentially loads the frames input from the image interface unit 12 on the frame memory 41 and causes the projection unit 20 to project the frames.

The light modulation device driving unit 46 is connected to the liquid crystal panels of the light modulation device 22. The light modulation device driving unit 46 drives the liquid crystal panels based on the image signals input from the image processing unit 40 and draws an image on each liquid crystal panel.

The input reception unit 17 is connected to a remote control light reception unit 18 and an operation panel 19 and detects an operation via the remote control light reception unit 18 and the operation panel 19. The remote control light reception unit 18 and the operation panel 19 function as input devices.

The remote control light reception unit 18 receives an infrared signal transmitted in response to a button operation by a remote controller (not illustrated) used by a user of the projector 100. The remote control light reception unit 18 decodes the infrared signal received from the remote controller, generates operation data indicating operation content in the remote controller, and outputs the operation data to the control unit 30.

The operation panel 19 is installed on an external casing of the projector 100 and includes various types of switches and indicator lamps. The input reception unit 17 appropriately turns on and off the indicator lamps of the operation panel 19 in accordance with an operation state or a setting state of the projector 100 under the control of the control unit 30. When the switches of the operation panel 19 are operated, operation data corresponding to the operated switches is output from the input reception unit 17 to the control unit 30.

The position detection unit 50 detects an instruction position of the position instruction operation with the instructor 70. The position detection unit 50 includes units of a photographing unit 51, a transmission unit 52, a photographing control unit 53, a target detection unit 54, and a coordinate calculation unit 55.

The photographing unit 51 photographs a photographic range including at least the projection region 10 and forms a photographic image. The position detection unit 50 detects an operation of the instructor 70 in the photographic range of the photographing unit 51. Accordingly, the photographic range of the photographing unit 51 is equivalent to a detection region of the position detection unit 50. In the embodiment, the detection region matches the projection region 10.

The photographing unit 51 includes an infrared image sensor photographing infrared light and an interface circuit and performs photographing using the infrared light. As the image sensor, one of a CCD and a CMOS can be used or another element can also be used. A photographic direction and a photographic range (angle of view) of the photographing unit 51 cover a range in which the projection optical system 23 projects an image to the screen SC in the same direction or substantially the same direction as the projection optical system 23, that is, the projection region 10. The photographing unit 51 outputs photographic image data after performing the photographing.

The photographing control unit 53 controls the photographing unit 51 such that the photographing unit 51 performs photographing under the control of the control unit 30. The photographing control unit 53 acquires the photographic image data of the photographing unit 51 and outputs the photographic image data to the target detection unit 54. An image of infrared light emitted by the instructor 70 is shown in the photographic image data obtained using the infrared light by the photographing unit 51.

The transmission unit 52 transmits a synchronization infrared signal to the instructor 70 under the control of the photographing control unit 53. The transmission unit 52 includes a light source such as an infrared LED and turns on and off the light source under the control of the photographing control unit 53.

The target detection unit 54 detects an image of the infrared light shown in the photographic image data of the photographing unit 51 and detects the coordinates of a position of the instructor 70 in the photographic image data. The target detection unit 54 determines whether the front end portion 71 of the instructor 70 comes into contact with the screen SC. Based on a determination result, the target detection unit 54 generates touch information indicating whether the front end portion 71 comes into contact with the screen SC. A method of determining whether the front end portion 71 of the instructor 70 comes into contact with the screen SC will be described below.

The coordinates of the position of the instructor 70 detected by the target detection unit 54 are coordinates in the photographic image data of the photographing unit 51.

The coordinate calculation unit 55 converts the coordinates of the position detected by the target detection unit 54 into coordinates on the screen SC. More specifically, the coordinate calculation unit 55 converts the coordinates of the position detected by the target detection unit 54 into coordinates at which an entire projection image (display image) to be projected to the screen SC is assumed to be a reference.

A relation between the photographic image of the photographing unit 51 and the projection image to be projected by the projection unit 20 is affected by various components such as a distance between the projector 100 and the screen SC, a zoom magnification in the projection optical system 23, an installation angle of the projector 100, and a distance between the photographing unit 51 and the screen SC. Based on a result of calibration performed beforehand, the coordinate calculation unit 55 calculates the coordinates at which the projection image on the screen SC is a reference on the basis of the coordinates detected from the photographic image data by the target detection unit 54. The coordinates calculated by the coordinate calculation unit 55 are processed as coordinates of an instruction position.

In the calibration, a predetermined pattern image is projected from the projection unit 20 to the screen SC under the control of the control unit 30 and the photographing unit 51 photographs the displayed pattern image. Then, based on the pattern image photographed by the photographing unit 51, the control unit 30 calculates a coordinate conversion parameter indicating a correspondence relation between coordinates in photographic image data and coordinates on the display image of the screen SC. The control unit 30 includes the calculated coordinate conversion parameter in, for example, the setting data 62 to store the coordinate conversion parameter in the storage unit 60. The coordinate calculation unit 55 can perform a process of converting the coordinates detected by the target detection unit 54 using the coordinate conversion parameter stored in the storage unit 60.

Here, the coordinates converted by the coordinate calculation unit 55 are coordinates on the display image of the screen SC, can be said to be coordinates in an image formed in the light modulation device 22, and can be said to be coordinates in an image drawn in the frame memory 41 by the image processing unit 40. Accordingly, the position detection unit 50 outputs the coordinates of the instruction position in which the image of the frame memory 41 is a reference to the control unit 30.

The instructor 70 includes a control unit 73, a transceiver unit 74, an operation switch 75, and a power unit 76. These units are accommodated in the shaft portion 72 (see FIG. 1).

The control unit 73 is connected to the transceiver unit 74 and the operation switch 75 and detects an ON/OFF state of the operation switch 75. The operation switch 75 is disposed at the front end portion 71 of the instructor 70 and is turned on when the front end portion 71 is tightly pressed against the screen SC. The transceiver unit 74 includes a light source such as an infrared LED and a light reception element that receives infrared light, turns on and off the light source under the control of the control unit 73, and outputs a signal indicating a light reception state of the light reception element to the control unit 73.

The power unit 76 includes a battery or a secondary cell as a power source and supplies power to the units, the control unit 73, the transceiver unit 74, and the operation switch 75. The instructor 70 may include a power switch that turns on/off power supply from the power unit 76.

A method of specifying a position of the instructor 70 from photographic image data of the photographing unit 51 through mutual communication of the position detection unit 50 and the instructor 70 will be described.

When an operation is detected with the instructor 70, the control unit 30 of the projector 100 controls the photographing control unit 53 and causes the transmission unit 52 to transmit a synchronization signal. That is, the photographing control unit 53 turns on the light source of the transmission unit 52 at a predetermined period under the control of the control unit 30. The infrared light periodically emitted by the transmission unit 52 functions as a synchronization signal for synchronizing the position detection unit 50 with the instructor 70.

On the other hand, after power starts to be supplied from the power unit 76 and the control unit 73 of the instructor 70 performs a predetermined initialization operation, the transceiver unit 74 receives the infrared light emitted by the transmission unit 52 of the projector 100. When the transceiver unit 74 receives the infrared light periodically emitted by the transmission unit 52, the control unit 73 causes the preset instructor 70 to turn on (emits light) the light source of the transceiver unit 74 in a unique lighting pattern in synchronization with a timing of the infrared light. The control unit 73 switches a lighting pattern of the transceiver unit 74 in accordance with an operation state of the operation switch 75. Therefore, the target detection unit 54 of the projector 100 can determine an operation state of the instructor 70, that is, whether the front end portion 71 is tightly pressed against the screen SC, based on a plurality of pieces of sequentially photographed photographic image data.

The control unit 73 repeatedly performs the foregoing operation while power is supplied from the power unit 76. That is, the transmission unit 52 periodically transmits the synchronization infrared signal to the instructor 70 and the instructor 70 transmits a preset infrared signal in synchronization with the infrared signal transmitted by the transmission unit 52.

The photographing control unit 53 performs control such that a photographic timing by the photographing unit 51 matches a timing at which the instructor 70 is turned on. The photographic timing is determined based on a timing at which the photographing control unit 53 turns on the transmission unit 52. The target detection unit 54 can specify a pattern in which the instructor 70 is turned on according to whether the image of the light of the instructor 70 is shown in the plurality of pieces of sequentially photographed photographic image data. The target detection unit 54 determines whether the front end portion 71 of the instructor 70 is tightly pressed against the screen SC based on the plurality of pieces of photographic image data and generates touch information.

The lighting pattern of the instructor 70 may be a unique pattern for each entity of the instructor 70 or may include a pattern common to the plurality of instructors 70 and a unique pattern for each entity. In this case, when images of the infrared light emitted by the plurality of instructors 70 are included in the photographic image data, the target detection unit 54 can distinguish the images as images of the different instructors 70.

The control unit 30 realizes functions of a projection control unit 31, an input detection unit 32, a communication control unit 33, an object processing unit 34, and a combination control unit 35 by reading and executing the control program 61 stored in the storage unit 60, and controls each unit of the projector 100.

The projection control unit 31 acquires operation content obtained when the user operates the remote controller based on the operation data input from the input reception unit 17. The projection control unit 31 controls the image processing unit 40, the light source driving unit 45, the light modulation device driving unit 46 in response to the operation performed by the user and projects an image to the screen SC.

The projection control unit 31 controls the image processing unit 40 such that the process of discriminating a 3D (stereoscopic) image from a 2D (planar) image, the resolution conversion process, the frame rate conversion process, the distortion correction process, the digital zoom process, the color tone correction process, and the luminance correction process described above are performed. The projection control unit 31 controls the light source driving unit 45 in accordance with a process of the image processing unit 40 such that the amount of light of the light source unit 21 is controlled.

The input detection unit 32 (a detection unit) detects an input involved in drawing. The input detection unit 32 acquires the coordinates of the instruction position output by the position detection unit 50. The input detection unit 32 outputs data indicating the coordinates acquired from the position detection unit 50 to the object processing unit 34.

When data of an operation position transmitted by the tablet 2 or 3 is received by the interface unit 11, the input detection unit 32 acquires the data of the operation position. The input detection unit 32 outputs the acquired data of the operation position to the object processing unit 34. Here, the data of the operation position received from the tablet 2 or 3 may be converted into data which can be processed by the object processing unit 34.

Thus, the input detection unit 32 detects a position instruction operation using the instructor 70 to acquire the instruction position and detects a position instruction operation by a touch of the tablet 2 or 3 to acquire the instruction position.

As described above, the tablet 2 has the function of specifying an operation position of a touch operation and transmitting coordinate data indicating the operation position when the touch operation is detected on the touch panel 201. The tablet 3 has the function of specifying an operation position of a detected touch operation and transmitting coordinate data indicating the operation position when the touch operation is detected on the touch panel 301. The coordinate data transmitted by the tablet 2 indicates coordinates in which the entire region in which a position is detected on the touch panel 201 is a reference. The input detection unit 32 converts the coordinate data received from the tablet 2 by the interface unit 11 into coordinate data in which a resolution of image data processed by the image processing unit 40 is a reference. Similarly, the coordinate data transmitted by the tablet 3 indicates coordinates in which the entire region in which a position is detected on the touch panel 301 is a reference. The input detection unit 32 converts the coordinate data received from the tablet 3 by the interface unit 11 into coordinate data in which a resolution of image data processed by the image processing unit 40 is a reference. That is, the input detection unit 32 converts the coordinates of the operation position detected by the tablet 2 or 3 into coordinates in an image drawn on the frame memory 41.

In the process converting the coordinates, the input detection unit 32 uses data regarding the coordinates of the entire region in which a position is detected on the touch panel 201. For example, a detection resolution of a region in which a position is detected by the touch panel 201, a position of the origin for each coordinate axis, and maximum coordinate values are included. As in the touch panel 201, the input detection unit 32 uses data regarding the coordinates of the entire region in which a position is detected on the touch panel 301. The input detection unit 32 uses data regarding the coordinates of the entire region in which a position is detected by the position detection unit 50. The data is included in, for example, the setting data 62. The input detection unit 32 uses data regarding the resolution of image data processed by the image processing unit 40. The data is included in, for example, the setting data 62.

On the other hand, coordinate data of an instruction position output to the control unit 30 by the position detection unit 50 is coordinates in an image drawn on the frame memory 41.

In this way, the input detection unit 32 can obtain the coordinates of the instruction position instructed by the instructor 70 and the coordinates of the instruction position instructed through the touch operation on the tablet 2 or 3 as coordinate data in which the resolution of image data processed by the image processing unit 40 is a reference.

The control unit 30 can also perform a GUI operation mode in which a GUI operation is realized based on the instruction position. While the GUI operation mode is performed, the control unit 30 displays an image for the GUI operation, such as a menu bar in the projection region 10. The input detection unit 32 determines whether there is an operation on an icon or the like of the menu bar based on the coordinate data of the instruction position and performs a process based on a determination result. The control unit 30 can switch between the GUI operation mode and an operation mode which is not the GUI operation mode, that is, a drawing mode in which drawing or the like is performed based on the instruction position. Hereinafter, an operation of the projector 100 in the drawing mode will be described.

In the drawing mode, the input detection unit 32 outputs the coordinate data of the instruction position to the object processing unit 34. The coordinate data of the instruction position includes the coordinate data output by the position detection unit 50 and the coordinate data obtained by converting the input detection unit 32 at the time of reception of the coordinate data received by the interface unit 11 from the tablet 2 or 3. The input detection unit 32 can also output data indicating an acquisition source of the coordinate data along with the coordinate data to the object processing unit 34. For example, when the coordinate data output by the position detection unit 50 is acquired and output to the object processing unit 34, the input detection unit 32 outputs data indicating that the acquisition source of the coordinate data is the position detection unit 50 to the object processing unit 34. The object processing unit 34 acquires the coordinate data output by the input detection unit 32 and the data indicating the acquisition source of the coordinate data.

The communication control unit 33 controls communication of the tablets 2 and 3 via the interface unit 11. The communication control unit 33 performs control such as selection of one tablet 3 or a plurality of tablets 3 from the plurality of tablets 3 and transmission of the image data to the selected tablets 3.

The object processing unit 34 draws a letter or a figure based on the coordinate data output by the input detection unit 32. For example, the object processing unit 34 disposes a preset image or letter at a position corresponding to the coordinate data output by the input detection unit 32. For example, the object processing unit 34 acquires a trajectory of the instruction position from the coordinate data output by the input detection unit 32 and performs a process of generating a display object on the basis of the acquired trajectory. The display object includes, for example, letters (text) or a figure (image) such as a straight line, a curved line, a polygon. A process in which the object processing unit 34 converts the trajectory of the instruction position into letters is referred to as a letter recognition process, and a process in which the object processing unit 34 generates an image according to the coordinates of the instruction position is referred to as a drawing process.

A kind of display object is designated under the control of the combination control unit 35. For example, the combination control unit 35 switches between a letter recognition mode in which the letter recognition process is performed by the object processing unit 34 and letters are input and the drawing mode in which the drawing process is performed by the object processing unit 34. The letter recognition mode and the drawing mode can be switched through an operation detected by the input detection unit 32. The object processing unit 34 generates text as a display object in the letter recognition mode and generates an image as a display object in the drawing mode.

The display object generated by the object processing unit 34 is transmitted to the image processing unit 40 by the combination control unit 35 and the image processing unit 40 combines the display object with the image on the frame memory 41. Thus, the image including the display object is projected by the projection unit 20.

The combination control unit 35 controls the object processing unit 34 such that the display object is generated based on the coordinate data output by the input detection unit 32. When the display object generated by the object processing unit 34 includes data of letters (text), the combination control unit 35 may convert the text data into image data and transmit the image data to the image processing unit 40. In addition, the object processing unit 34 may generate the display object obtained by converting the text data into the image data.

The combination control unit 35 transmits the image data of the display object to the image processing unit 40. The combination control unit 35 controls a process of superimposing the display object on the image drawn on the frame memory 41 by the image processing unit 40. The image processing unit 40 performs a combination process of combining the display object with the image of the frame memory 41 under the control of the combination control unit 35. In the combination process, the image processing unit 40 draws an image based on the image data of the display object to be superimposed on the image drawn on the frame memory 41 based on the input image data to form one image. After the combination process, the frame memory 41 is in a state in which one image is stored. The combination control unit 35 controls a position at which the display object is disposed on the frame memory 41 by the image processing unit 40 or a size of the display object.

When the image processing unit 40 performs the combination process, the combination control unit 35 generates image data of the image stored in the frame memory 41 before the combination and stores the image data as the first display data 601 (see FIG. 4) in the storage unit 60. The combination control unit 35 generates image data of the image after the combination process and stores the image data as the second display data 602 in the storage unit 60 in association with the first display data 601. The combination control unit 35 stores the input terminal data 603 in association with the second display data 602.

The object processing unit 34 can acquire data indicating an acquisition source of the coordinate data along with the coordinate data from the input detection unit 32. When the display object generated by the object processing unit 34 is transmitted to the image processing unit 40, the combination control unit 35 acquires the data indicating the acquisition source of the coordinate data. That is, the combination control unit 35 acquires the data indicating the acquisition source of the coordinate data used for the letter recognition process or the drawing process of generating the display object along with the display object from the object processing unit 34. The data indicating the acquisition source of the coordinate data is stored as the input terminal data 603 in the storage unit 60. The input terminal data 603 generated whenever the object processing unit 34 generates the display object or the combination control unit 35 combines the display object. Accordingly, as a typical example, one piece of input terminal data 603 is stored to correspond to one piece of second display data 602, and thus the second display data 602 and the input terminal data 603 have one-to-one correspondence.

A timing at which the combination control unit 35 performs a process of generating and storing the first display data 601 is arbitrary. In the embodiment, two examples will be described. In a first example, when the image processing unit 40 loads an image on the frame memory 41 or an image of the frame memory 41 is projected, the combination control unit 35 generates the first display data 601. In a second example, when the image processing unit 40 performs the combination process, the combination control unit 35 generates the first display data 601 based on an image of the frame memory 41 before the combination.

In the first and second examples, the first display data 601 is not limited to the input image data acquired by the image processing unit 40. For example, when the control unit 30 reads image data stored as the first display data 601 or the second display data 602 in the storage unit 60 and the image data is transmitted to the image processing unit 40, the image processing unit 40 loads the transmitted image data. In this case, the combination control unit 35 can store the image data of the image loaded on the frame memory 41 by the image processing unit 40 as the first display data 601.

The second display data 602 is image data of an image of the frame memory 41 after the image processing unit 40 performs the combination process. When the image processing unit 40 combines the display object, the combination control unit 35 generates the second display data 602 based on the combined image. When the object processing unit 34 generates the display object, the input terminal data 603 indicates an apparatus (device) performing an input. Accordingly, an apparatus corresponding to the display object included in the second display data 602 can be specified with the input terminal data 603. For example, a case will be assumed in which the object processing unit 34 generates the display object based on the instruction position of a touch operation on the tablet 2 and the combination control unit 35 combines the display object. In this case, the image data of the combined image is stored as the second display data 602 and the input terminal data 603 indicating the tablet 2 is stored in association with the second display data 602.

Figure 5:
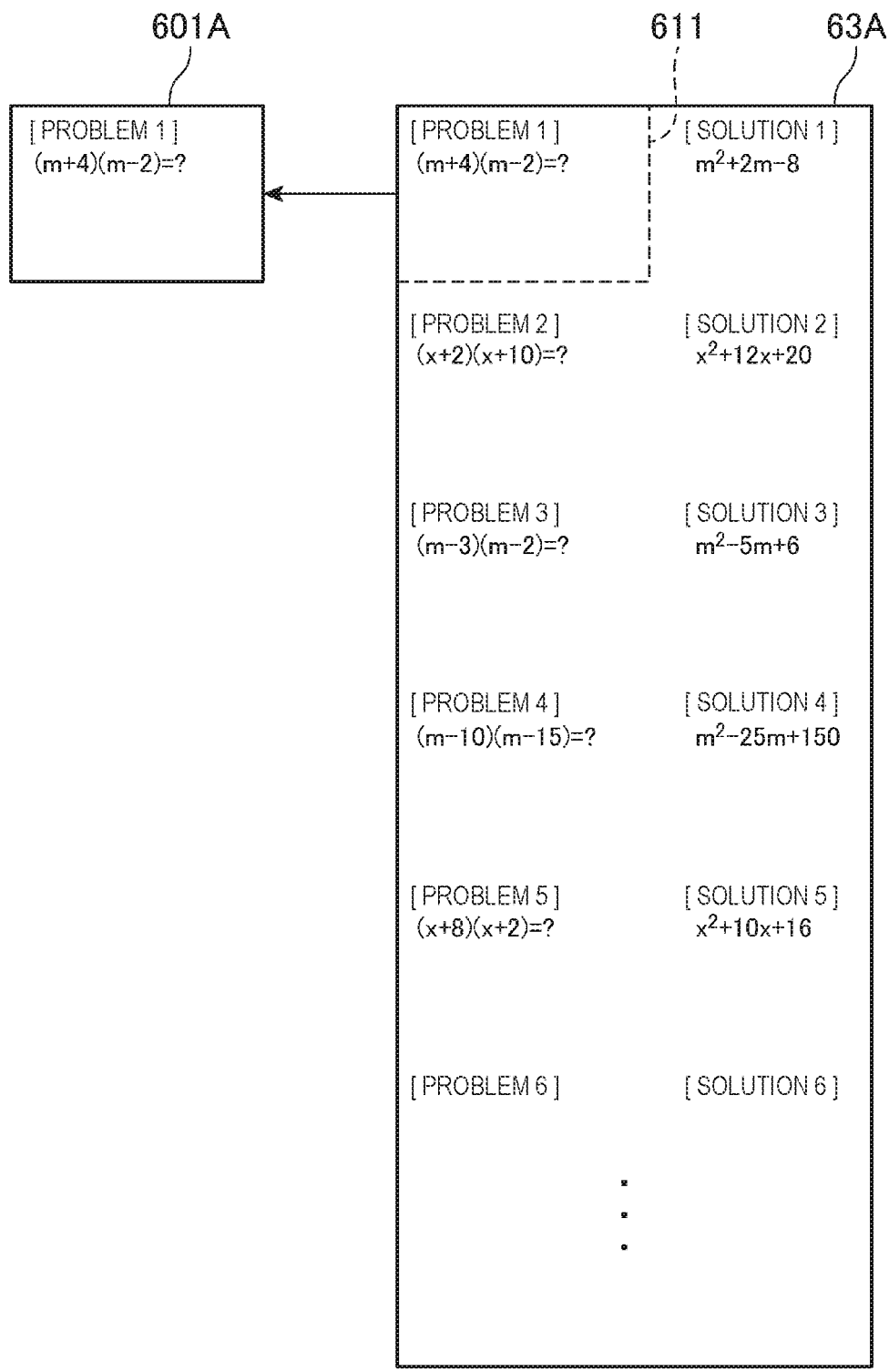
FIG. 5 is a diagram illustrating a process of displaying a part of content data.

FIG. 5 is a diagram illustrating an operation of the projector 100 and illustrating a process of cutting and displaying a part of content data. Content data 63A illustrated in FIG. 5 is one specific example of the content data 63 and is letter data. The content data 63A has a size larger than a size which can be displayed by the projector 100. Specifically, in both the transverse direction (horizontal direction) and the longitudinal direction (vertical direction) of the content data 63A, the size is larger than the size which can be displayed by the projector 100, that is, the size of an image drawn on the frame memory 41. Here, the size indicates the number of dots (the number of pixels) of image data in the transverse direction or the longitudinal direction.

The size of the frame memory 41 is suitable for the number of pixels or the number of dots which can be formed in the light modulation device 22 included in the projection unit 20. Accordingly, the size of an image drawn on the frame memory 41 by the image processing unit 40 corresponds to the size of an image formed in the light modulation device 22. More specifically, a maximum size of an image which can be formed in the light modulation device 22 is identical.

The content data 63A is an example of the content data 63 for learning and is specifically an educational material for mathematics. Mathematical problems are disposed on the left side of the content data 63A and solutions to the problems are disposed on the right side of the problems. The plurality of problems can be arrayed in the longitudinal direction of the content data 63A. In the display system 1, a user operating the tablet 2 can operate the projector 100 to sequentially display the problems and the solutions of the content data 63A and perform a mathematical lecture.

When the size of the input image data is different from the size which can be drawn on the frame memory 41, the image processing unit 40 has a function of loading the entire input image data on the frame memory 41 and drawing an image by expanding or contracting the input image data. Accordingly, the image processing unit 40 can contract the entire content data 63A and load the contacted content data 63A on the frame memory 41. In this case, the entire content data 63A is contracted and projected to a projection region of the screen SC.

The image processing unit 40 can also cut and display a part of the input image data. For example, when the control unit 30 causes the image processing unit 40 to designate a display magnification at the time of loading the input image data on the frame memory 41, the image processing unit 40 expands or contracts the input image data according to the designated display magnification. When the size of the input image data is larger than the size which can be loaded on the frame memory 41 as the result obtained by expanding or contracting the input image data, the control unit 30 controls the image processing unit 40 such that the process of cutting the input image data is performed. In this case, the control unit 30 cuts a range fitted to the size of the frame memory 41 from the input image data.

In the image processing unit 40, a displayable size is set as an upper limit of the size of the input image data. The displayable size is the size of the input image data which can be loaded on the frame memory 41. The image processing unit 40 according to the embodiment can perform a digital zoom process under the control of the control unit 30. Through the digital zoom process, the image processing unit 40 expands (extends) the input image data according to the magnification designated by the control unit 30 to load the input image data on the frame memory 41. Accordingly, when the magnification of the digital zoom process is larger than one time, the upper limit of the size of the image data which can be loaded on the frame memory 41 is less than the size of the frame memory 41. The image processing unit 40 can determine whether the size of the input image data exceeds the displayable size which is the upper limit of the size which can be loaded on the frame memory 41. The displayable size is designated according to the magnification of the digital zoom process designed by the control unit 30. The displayable size may be set by the control unit 30 or the displayable size may be set in the image processing unit 40 according to the magnification designated by the control unit 30. The size of the input image data and the size of the frame memory 41 are expressed by, for example, a resolution or the number of dots. When the size of the input image data exceeds the displayable size, the image processing unit 40 performs a process of cutting a portion equivalent to the displayable size from the input image data.

For example, in regard to the content data 63A in FIG. 5, the image processing unit 40 cuts display data 611. The size of the cut display data 611 is a size fitted to the displayable size. The displayable size corresponds to, for example, a display resolution of a liquid crystal panel included in the light modulation device 22 or the number of pixels of the displayable region set in the liquid crystal panel. The image processing unit 40 may be configured to convert the resolution of the display data 611 in conformity to the displayable region of the light modulation device 22 or the entire light modulation device 22 or perform geometric correction. In this case, the size of the display data 611 is determined so that the image processing unit 40 can easily process the display data 611 to be suitable for the displayable size.

The position of the display data 611 in the content data 63A is not limited. FIG. 5 illustrates an example of a case in which the image processing unit 40 cuts the display data 611 when display of the content data 63A is started. Therefore, the display data 611 in FIG. 5 includes a top left corner portion which is a beginning position of the content data 63A.

The position of the display data 611 in the content data 63A, that is, a cut position, can be designated under the control of the control unit 30. The control unit 30 can set the position of the display data 611 cut from the content data 63A in response to an operation detected by the position detection unit 50 or an operation on the tablet 2 or 3.

In a state in which the projector 100 displays an image based on the display data 611, the control unit 30 changes the cut position of the content data 63A through an operation of the tablet 2 or 3 or the instructor 70. In this case, the control unit 30 causes the input detection unit 32 to receive the operation performed with the tablet 2 or 3 or the instructor 70. The control unit 30 newly sets a position at which the display data 611 is cut in the content data 63A according to the operation received by the input detection unit 32. The control unit 30 controls the image processing unit 40 such that the display data 611 is cut at the newly set position and loaded on the frame memory 41. The control unit 30 switches the image displayed based on the display data 611 to an image based on the display data 611 newly cut from the content data 63A.

In a state in which the image based on the display data 611 is displayed by the image processing unit 40, the control unit 30 can generate the display object based on an operation received by the input detection unit 32 and combine the display object with an image which is being displayed. For example, in a state in which an image including a mathematical problem is displayed based on the display data 611 in FIG. 5, the projector 100 can draw a letter or an image and display the letter or the image to be superimposed on the mathematical problem.

The control unit 30 may be configured to control the image processing unit 40 such that the process of cutting a part of the content data 63 can also be performed on input image data input to the interface unit 11 and input image data input to the image interface unit 12.

When the display data 611 cut from the content data 63A is displayed, the control unit 30 generates and stores the first display data 601 through a process to be described below. Through this process, the control unit 30 stores image data of the display data 611 or image data generated from the display data 611 as the first display data 601A in the storage unit 60. The first display data 601A is equivalent to one specific example of the first display data 601. The first display data 601A may be the display data 611. In addition, the first display data 601A may be image data obtained by converting the resolution of the display data 611 or data obtained by performing geometric correction on the display data 611 or may be data obtained by causing the image processing unit 40 to perform other image processing on the display data 611.

Figure 6:
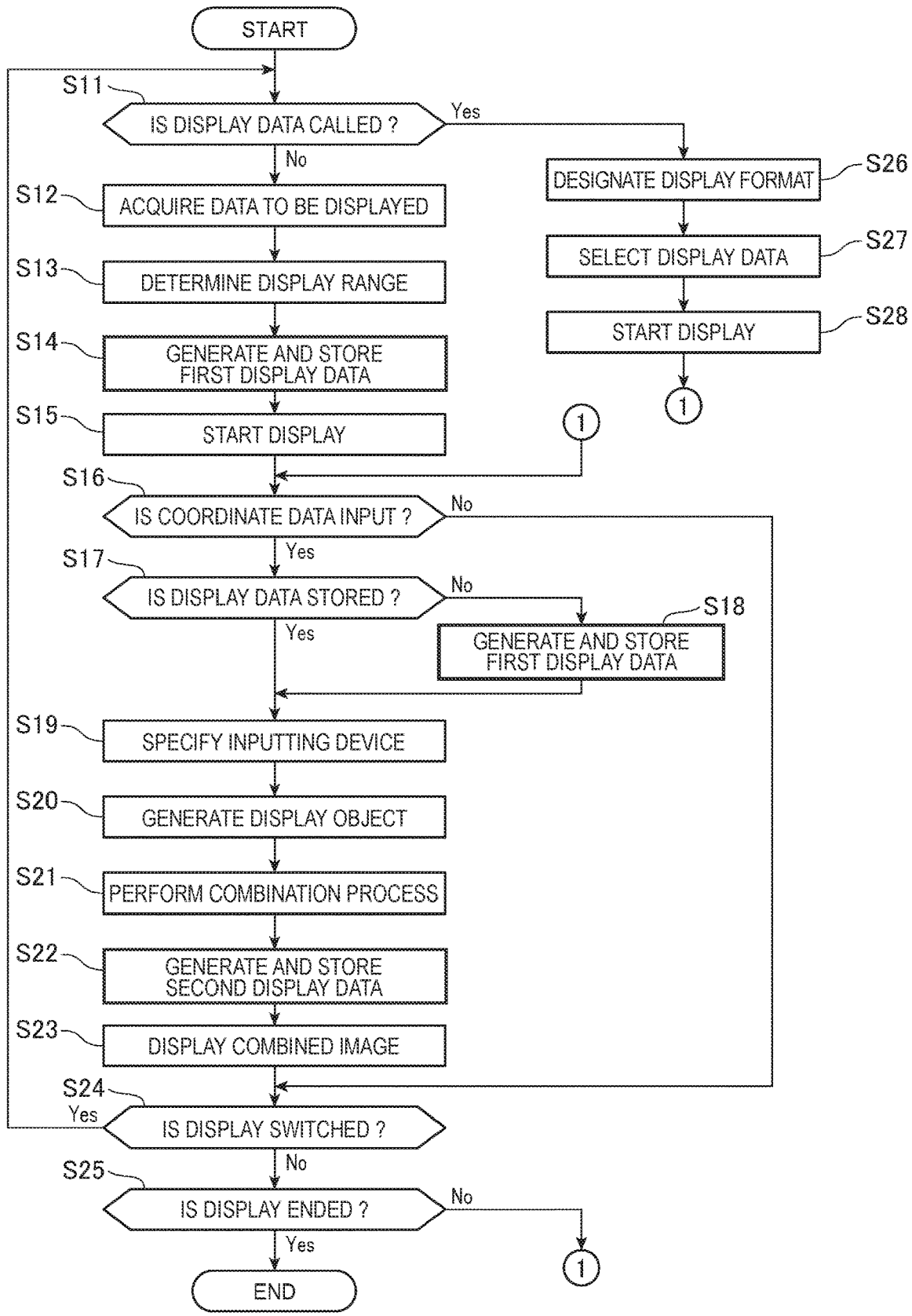
FIG. 6 is a flowchart illustrating an operation of the projector.

FIG. 6 is a flowchart illustrating an operation of the projector 100. The operation illustrated in FIG. 6 is performed when the projector 100 starts projecting an image.

The control unit 30 of the projector 100 determines whether display data is called from the storage unit 60 according to an operation detected by the input detection unit 32 or previous setting (step S11). The display data of the storage unit 60 includes the first display data 601 and the second display data 602. A case in which no display data is called corresponds to a case in which an image is displayed based on the content data 63 and a case in which an image is displayed based on the input image data input to the interface unit 11 or the image interface unit 12. Here, a case in which the content data 63 is read to display an image will be described as an example. In step S11, the combination control unit 35 determines whether the first display data 601 or the second display data 602 is called. This determination is performed based on whether an instruction to call the first display data 601 or the second display data 602 is input through an operation detected by the input detection unit 32. When the first display data 601 or the second display data 602 is not called, as will be described below, the combination control unit 35 acquires the content data 63. Accordingly, when an instruction to read the content data 63 is input by the input detection unit 32 or when reading the content data 63 is set, it is determined that no display data is called from the storage unit 60. When it is determined that no display data is called from the storage unit 60 (No in step S11), the control unit 30 acquires the content data 63 (step S12).

The control unit 30 determines a range displayed in the acquired content data 63 and acquires data of the display range (step S13). For example, when the size of the content data 63 exceeds the displayable range as in the content data 63A in FIG. 5, for example, the control unit 30 causes the image processing unit 40 to cut a part of the content data 63 as in the display data 611. The image processing unit 40 loads the data in the display range cut in step S13 on the frame memory 41 and draws an image on the frame memory 41. When the size of the content data 63 is equal to or less than the displayable range, the control unit 30 acquires the entire content data 63 as the data in the display range. In this case, the control unit 30 controls the image processing unit 40 such that the content data 63 can be expanded, loaded on the frame memory 41, and drawn. The control unit 30 controls the image processing unit 40 such that an image is drawn in a part of the frame memory 41 based on the content data 63 and a region not drawn around the drawn image may be set with black. Since the black region is a region in which image light is not projected by the projection unit 20, the black region does not have an effect on display of the screen SC.

The control unit 30 generates the first display data 601 which is image data of the image drawn on the frame memory 41 by the image processing unit 40 and stores the first display data 601 in the storage unit 60 (step S14). Thus, as will be described below, the image data in a state before the drawing is stored as the first display data 601.

Thereafter, the control unit 30 causes the projection unit 20 to display the image drawn on the frame memory 41 (step S15).

After the display is started, the control unit 30 determines whether an input of the coordinate data is received by the input detection unit 32 (step S16). The control unit 30 determines whether the coordinate data is input from the tablet 2 or 3 or the position detection unit 50 (step S16). When one of an operation on the touch panel 201 of the tablet 2, an operation on the touch panel 301 of the tablet 3, and an operation with the instructor 70 is performed, the input detection unit 32 receives an input of the coordinate data. When the input detection unit 32 receives the input of the coordinate data (Yes in step S16), the control unit 30 determines whether the first display data 601 is already generated (step S17). In step S17, the control unit 30 determines whether the image data of the image drawn on the frame memory 41 is already stored as the first display data 601. In step S17, the control unit 30 determines the image which is being displayed at the time of receiving the input of the coordinate data in step S16, that is, the image drawn on the frame memory 41, as a target. In other words, it is determined whether the data of the image displayed immediately before a process of combining the display object in steps S20 and S21 to be described below is performed is stored as the first display data 601.

When the control unit 30 determines that the image which is being displayed is not stored as the first display data 601 (No in step S17), the control unit 30 stores the image data of the image in the frame memory 41 as the first display data 601 in the storage unit 60 (step S18) and causes the process to proceed to step S19. Conversely, when the control unit 30 determines that the image which is being displayed is stored as the first display data 601 (Yes in step S17), the control unit 30 causes the process to proceed to step S19.

In step S19, the control unit 30 specifies the device inputting the coordinate data received by the input detection unit 32, that is, the device of the acquisition source of the coordinate data (step S19).

The control unit 30 causes the object processing unit 34 to generate the display object based on the coordinate data (step S20). The control unit 30 causes the combination control unit 35 to perform the process of combining the display object generated by the object processing unit 34 with the image in the frame memory 41 (step S21). Here, the control unit 30 generates the second display data 602 and stores the second display data 602 in the storage unit 60 based on the image data after the combination in the frame memory 41 (step S22). For example, the data of the image combined in step S19 can be set as the second display data 602 without change. In step S22, the control unit 30 stores the second display data 602 in the storage unit 60 in association with the first display data 601 stored in step S14.

Here, the control unit 30 generates the input terminal data 603 indicating the device specified in step S17 and stores the input terminal data 603 in the storage unit 60 in association with the second display data 602 generated in step S20.

The control unit 30 causes the projection unit 20 to project the combined image combined in the frame memory 41 (step S23).

The control unit 30 causes the input detection unit 32 to determine whether an operation of giving an instruction to convert the content data 63 which is being displayed or the range displayed in the content data 63 is performed (step S24). When the instruction to switch the display is determined to be performed (Yes in step S24), the control unit 30 returns the process to step S11.

When the instruction to switch the display is determined not to be performed (No in step S24), the control unit 30 determines whether the display is ended (step S25). When the display is not ended (No in step S25), the control unit 30 returns the process to step S16.

Conversely, when the control unit 30 determines that the display data is called from the storage unit 60 (Yes in step S11), the control unit 30 performs a process of displaying the first display data 601 or the second display data 602. First, the control unit 30 performs a process of selecting a display format of the first display data 601 or the second display data 602 (step S26).

As will be described below, the projector 100 can display the first display data 601 and the second display data 602 in a plurality of display formats. For example, "entire surface display" in which the first display data 601 or the second display data 602 is displayed in the entire display region and "array display" in which a plurality of pieces of first display data 601 or second display data 602 are arrayed and displayed in one display region can be selected. The display region may be a region in which drawing is possible in the frame memory 41 or a displayable region which is a maximum region in which the light modulation device 22 can form an image. A region of the frame memory 41 corresponding to the projection region 10 (see FIG. 1) may be set as the display region. Here, when the control unit 30 controls the image processing unit 40 such that a geometric correction process such as trapezoidal distortion correction is performed, a region in which an image can be drawn and formed is a region less than the displayable region. In this case, the region in which an image can be drawn and formed is regarded as the displayable region. The control unit 30 can also control the image processing unit 40 such that a display region in which the first display data 601 and the second display data 602 are displayed is limited to a part of the displayable region. In this case, the control unit 30 displays one piece or a plurality of pieces of first display data 601 or second display data 602 in the entire surface display or array display format to fall within the set display region.

In step S26, the control unit 30 designates a display format through an operation received by the input detection unit 32 or according to preset content. When the display format is set in advance, data indicating this setting is stored as, for example, the setting data 62 in the storage unit 60.

The control unit 30 selects the read display data through an operation received by the input detection unit 32 (step S27). The display data selectable herein may be one of the first display data 601 and the second display data 602.

The control unit 30 reads the display data selected in step S27 from the storage unit 60, controls the image processing unit 40, loads the frame memory 41, and displays the display data (step S28). After the display is started, the control unit 30 causes the process to proceed to step S16.

In the operation of FIG. 6, the process of displaying the content data 63, or the first display data 601 or the second display data 602 is performed. When an image is displayed based on the content data 63, the first display data 601 is generated and stored in step S14. Therefore, the display data corresponding to all the images displayed under the control of the control unit 30 is generated and stored.

When the display object is combined in step S21, the control unit 30 generates and stores the first display data 601 in regard to the image before the combination in step S17. When the display object is combined in step S21 in the state in which the second display data 602 is selected and displayed in step S27, the second display data 602 which is being displayed is newly stored as the first display data 601.

Then, the data of the image after the combination of the display object in step S21 is stored as the second display data 602. The first display data 601 and the second display data 602 are stored in the storage unit 60 in association therewith. Accordingly, the storage unit 60 stores the first display data 601 and the second display data 602 in association with the second display data 602 obtained by combining the display object with the second display data 602. The second display data 602 before the combination of the display object may be stored as the first display data 601. As a result, the storage unit 60 stores the plurality of pieces of second display data 602 in association with one piece of first display data 601 and further stores the second display data 602 combined with the display object in association with each piece of second display data 602. In other words, the storage unit 60 stores the first display data 601 and the plurality of pieces of second display data 602 in a tree diagram form.

The storage unit 60 stores the input terminal data 603 in association with the second display data 602. The input terminal data 603 is data for specifying a device outputting an instruction position used in the process of generating the display object included in the second display data 602. Accordingly, the second display data 602 including the display object generated through an operation on the tablet 2 can be retrieved and extracted from the storage unit 60 based on the input terminal data 603.

Figure 7:
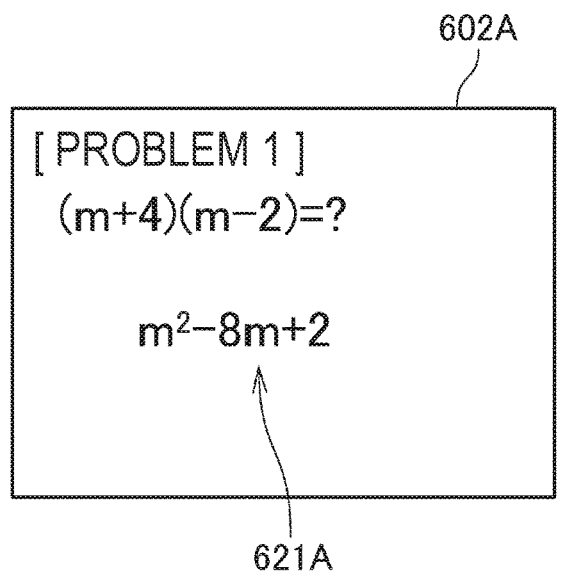
FIG. 7 is a diagram illustrating an example of second display data.

FIG. 7 is a diagram illustrating the second display data 602A as an example of the second display data 602. The second display data 602A is data of an image obtained by combining a display object 621A with the image of the first display data 601A (see FIG. 5).

When a display range is designated in the content data 63 in step S13 and the display data 611 (see FIG. 5) is generated, an image based on the display data 611 is displayed on the screen SC. When the first display data 601A is selected in step S27, the image based on the first display data 601A is displayed on the screen SC. This image is the same as the image based on the display data 611.

Then, when the object processing unit 34 generates the display object 621A according to an instruction position of an operation received by the input detection unit 32 and combines the display object 621A, a combined image is projected to the screen SC. The control unit 30 stores data of the combined image as the second display data 602A in the storage unit 60. The control unit 30 stores the input terminal data 603 for specifying a device inputting the instruction position which is a basis of the process of generating the display object 621A in association with the second display data 602A.

Figure 8:
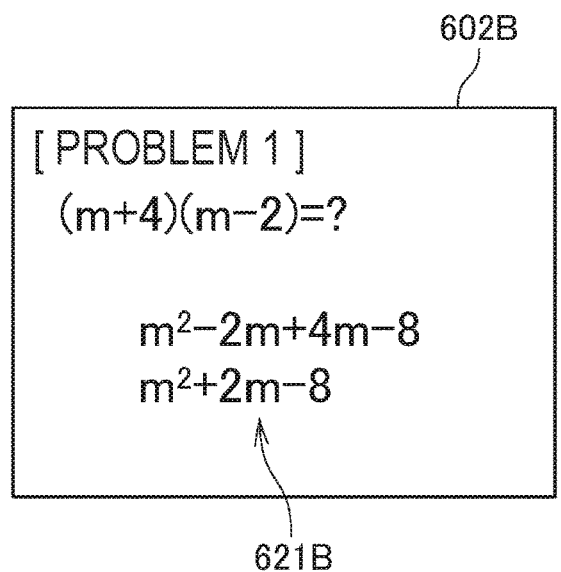
FIG. 8 is a diagram illustrating an example of the second display data.

FIG. 8 is a diagram illustrating the second display data 602B as an example of the second display data 602. The second display data 602B is data of an image obtained by combining a display object 621B with the image of the first display data 601A.

Figure 9:
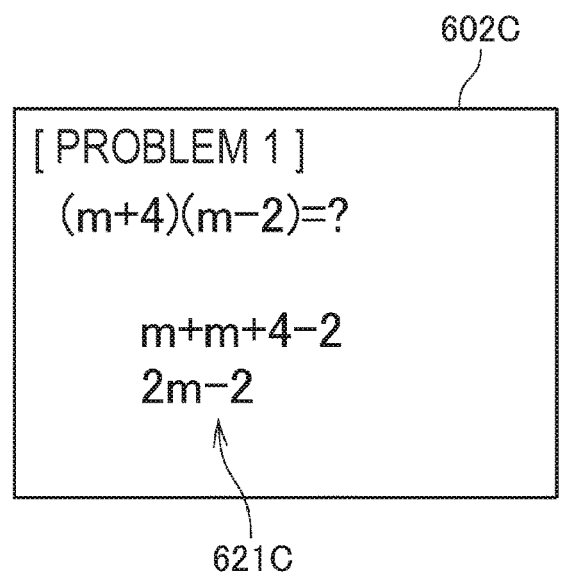
FIG. 9 is a diagram illustrating an example of the second display data.

FIG. 9 is a diagram illustrating the second display data 602C as an example of the second display data 602. The second display data 602C is data of an image obtained by combining a display object 621C with the image of the first display data 601A.

The second display data 602A, the second display data 602B, and the second display data 602C are generated through the processes of combining the display objects 621A, 6218B, and 621C with the first display data 601A, respectively. The storage unit 60 stores the second display data 602A, the second display data 602B, and the second display data 602C in association with the first display data 601A. The storage unit 60 stores the input terminal data 603 for specifying the device inputting the instruction position which is a basis of the process of generating the display objects 621B and 621C in association with the pieces of second display data 602B and 602C.

Therefore, when an image before combination of the display object 621A is displayed in a state in which the second display data 602A is generated and an image based on the second display data 602A is displayed, the projector 100 may display the first display data 601A. This is true for the pieces of second display data 602B and 602C. That is, a process of drawing the display objects 621A, 621B, and 621C and subsequently displaying a state before the drawing can be performed quickly. In this process, for example, it is not necessary to designate the positions or ranges of the display objects 621A, 621B, and 621C which are displayed and give an instruction to erase the display. Therefore, a process of erasing or not displaying the display objects 621A, 621B, and 621C can be performed through a simple operation. There is the advantage of not erasing other components included in the images which are being displayed when the display objects 621A, 621B, and 621C are erased.

Specifically, the control unit 30 performs the foregoing process when one of the display objects 621A, 621B, and 621C is generated and combined by the object processing unit 34 and subsequently an instruction to return (undo) the drawing of the object to the original is detected by the input detection unit 32. In this case, only when the instruction to return the drawing of the object to the original is detected based on an input of a device specified by the input terminal data 603, the control unit 30 may perform the foregoing process not to display the display object. That is, a device performing an operation of giving an instruction to erase the display object or not to display the display object may function as a determination unit performing determination. In this case, the control unit 30 performs determination based on the input terminal data 603.

Further, another display object can also be combined with the second display data 602A, the second display data 602B, and the second display data 602C.

Figure 10:
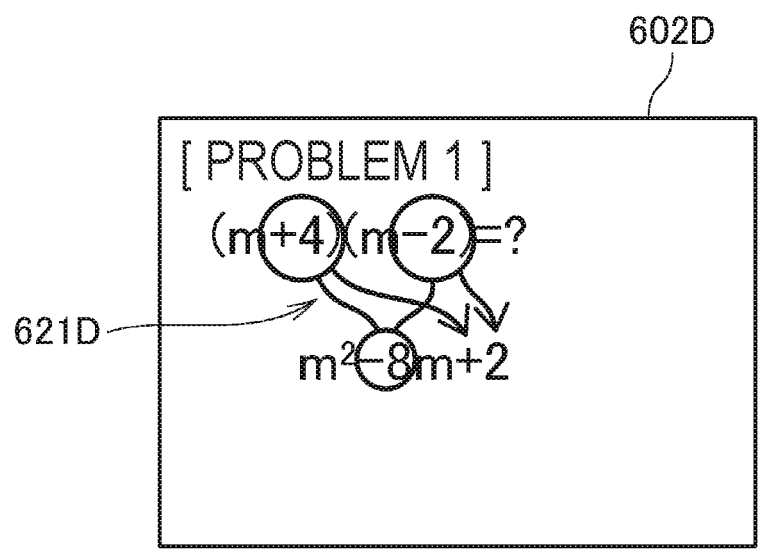
FIG. 10 is a diagram illustrating an example of the second display data.

FIG. 10 is a diagram illustrating second display data 602D as an example of the second display data 602. The second display data 602D is data of an image in which the display object 621D is combined with the image displayed based on the second display data 602A (see FIG. 7). When the display object 621D is combined in the frame memory 41 in a state in which the second display data 602A is selected and the second display data 602A is loaded to the frame memory 41 in step S27, the second display data 602D is generated in step S22. In this example, the second display data 602A which is data of an image before the combination of the display object 621D and the second display data 602D which is data of an image after the combination are stored in the storage unit 60 in association therewith. The same data as the second display data 602A may be stored as the first display data 601 in the storage unit 60.

Figure 11:
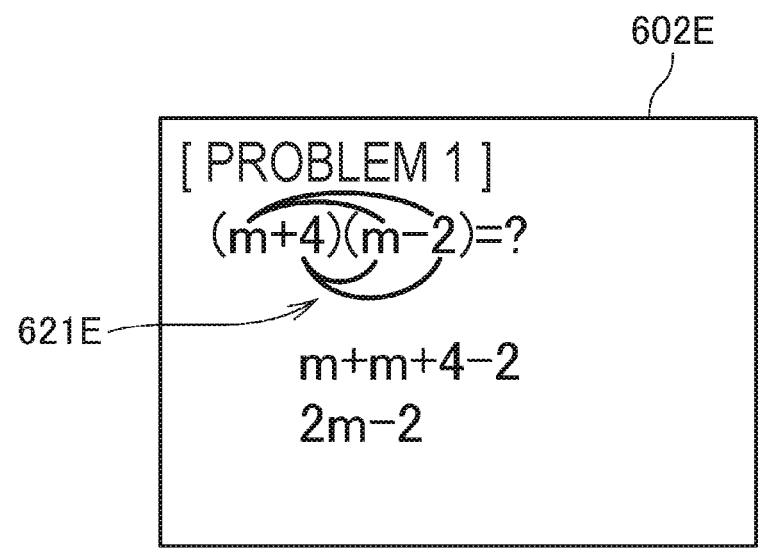
FIG. 11 is a diagram illustrating an example of the second display data.

FIG. 11 is a diagram illustrating second display data 602E as an example of the second display data 602. The second display data 602E is data of an image in which the display object 621E is combined with the image displayed based on the second display data 602C (see FIG. 8). In this example, the second display data 602C which is data of an image before the combination of the display object 621E and the second display data 602E which is data of an image after the combination are stored in the storage unit 60 in association therewith. The same data as the second display data 602B may be stored as the first display data 601 in the storage unit 60.

Figure 12:
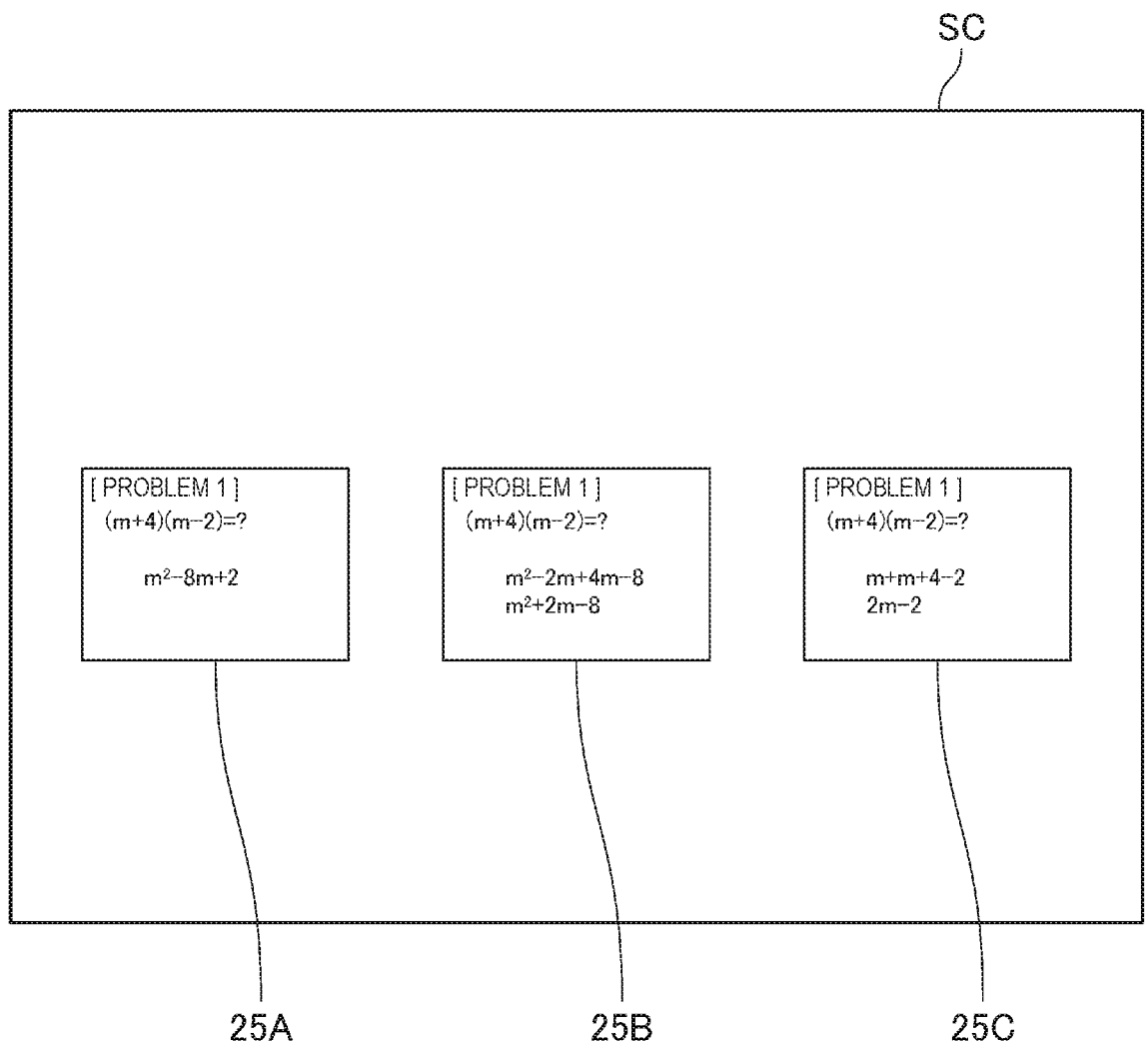
FIG. 12 is a diagram illustrating a display example of the projector.

FIG. 12 is a diagram illustrating a display example of the projector 100.

In this example, the display objects 25A, 25B, and 25C are arrayed and displayed on the screen SC. The display object 25A is an image displayed based on the second display data 602A and the display object 25B is an image displayed based on the second display data 602B. The display object 25C is an image displayed based on the second display data 602C. As exemplified in FIG. 12, in the projector 100, a display format in which images based on the second display data 602 stored in the storage unit 60 are arrayed and disposed in step S26 can be selected. Here, since the images based on the pieces of second display data 602A, 602B, and 602C are the display objects 25A, 25B, and 25C, for example, a display form such as movement or expansion/contraction of a display position can be changed through an operation on the tablet 2 or 3 or the instructor 70. That is, the pieces of second display data 602A, 602B, and 602C which are data of a display image equivalent to one surface can be processed as objects disposed in the projection region 10 or a display region. In this display format, an image corresponding to the first display data 601 stored in the storage unit 60 may be disposed without being limited to the second display data 602. An image based on the first display data 601 and an image based on the second display data 602 may be simultaneously disposed.

Figure 13:
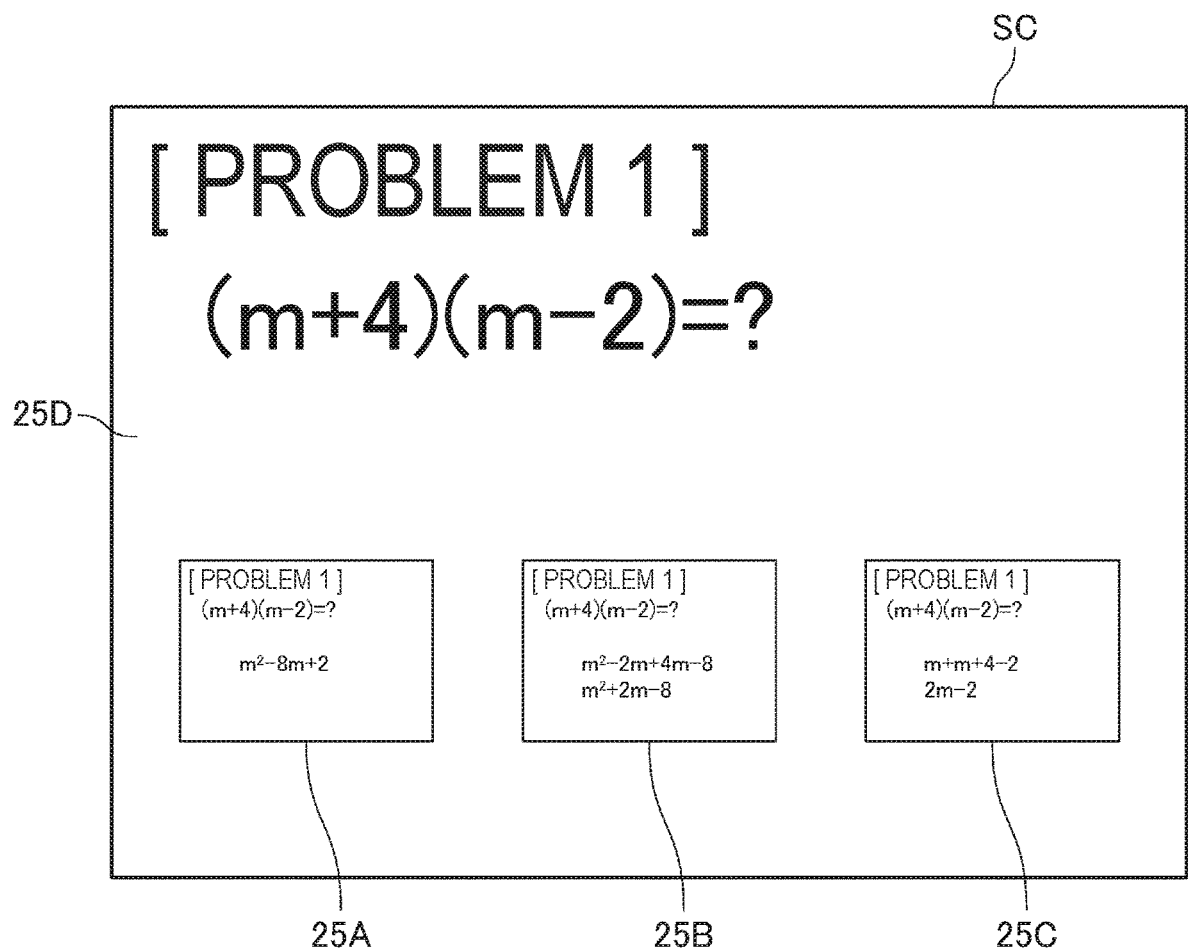
FIG. 13 is a diagram illustrating a display example of the projector.

FIG. 13 is a diagram illustrating a display example of the projector 100.

In this example, the display object 25D is displayed on the entire projection region 10 of the screen SC. The display objects 25A, 25B, and 25C are arrayed and displayed to be superimposed on the display object 25D. The display object 25D is an image displayed based on the first display data 601A. As in the example of FIG. 13, the image based on the first display data 601 or the second display data 602 may be displayed as a display object and the image based on another first display data 601 or second display data 602 may be displayed to be superimposed on the display object.

Figure 14:
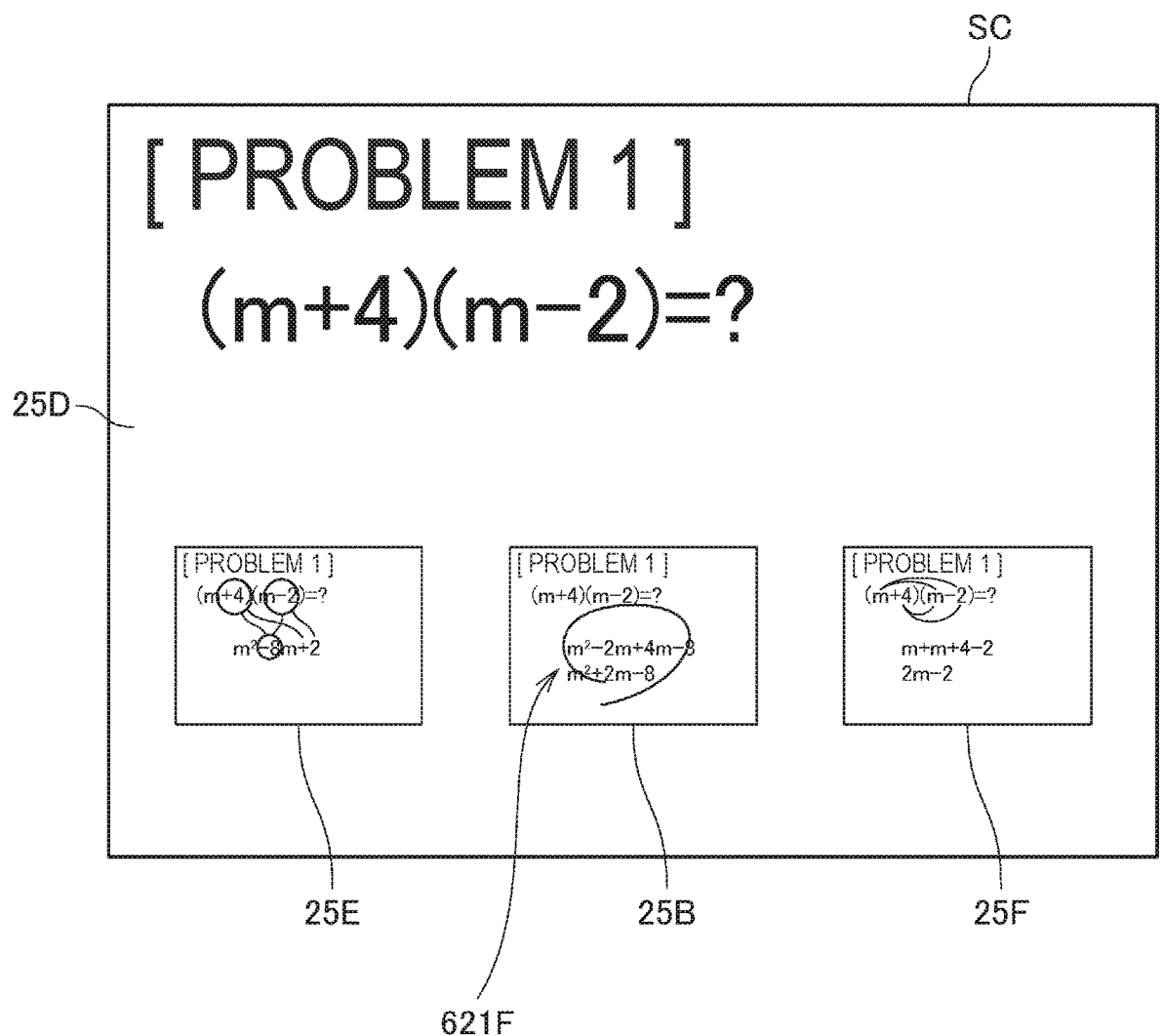
FIG. 14 is a diagram illustrating a display example of the projector.

FIG. 14 is a diagram illustrating a display example of the projector 100.

This example is a display example in a state in which a new display object 621F is combined with the display object 25B in the display state illustrated in FIG. 13. When a position instruction operation is performed using the tablet 2 or 3 or the instructor 70 in the display example illustrated in FIGS. 12 and 13, the control unit 30 can perform a process of generating and combining a display object. In this case, a display image before the combination of the display object, that is, image data of an image in which the display objects 25A, 25B, and 25C are superimposed on the display object 25D by the control unit 30, is stored as the first display data 601 in the storage unit 60. Then, the control unit 30 stores the image data of the image after the combination of the display object 25F as the second display data 602 in the storage unit 60.

Only a part of the projection region 10 of the screen SC can also be used as a display format in which a plurality of images based on the first display data 601 and/or the second display data 602 are disposed as display objects.

Figure 15:
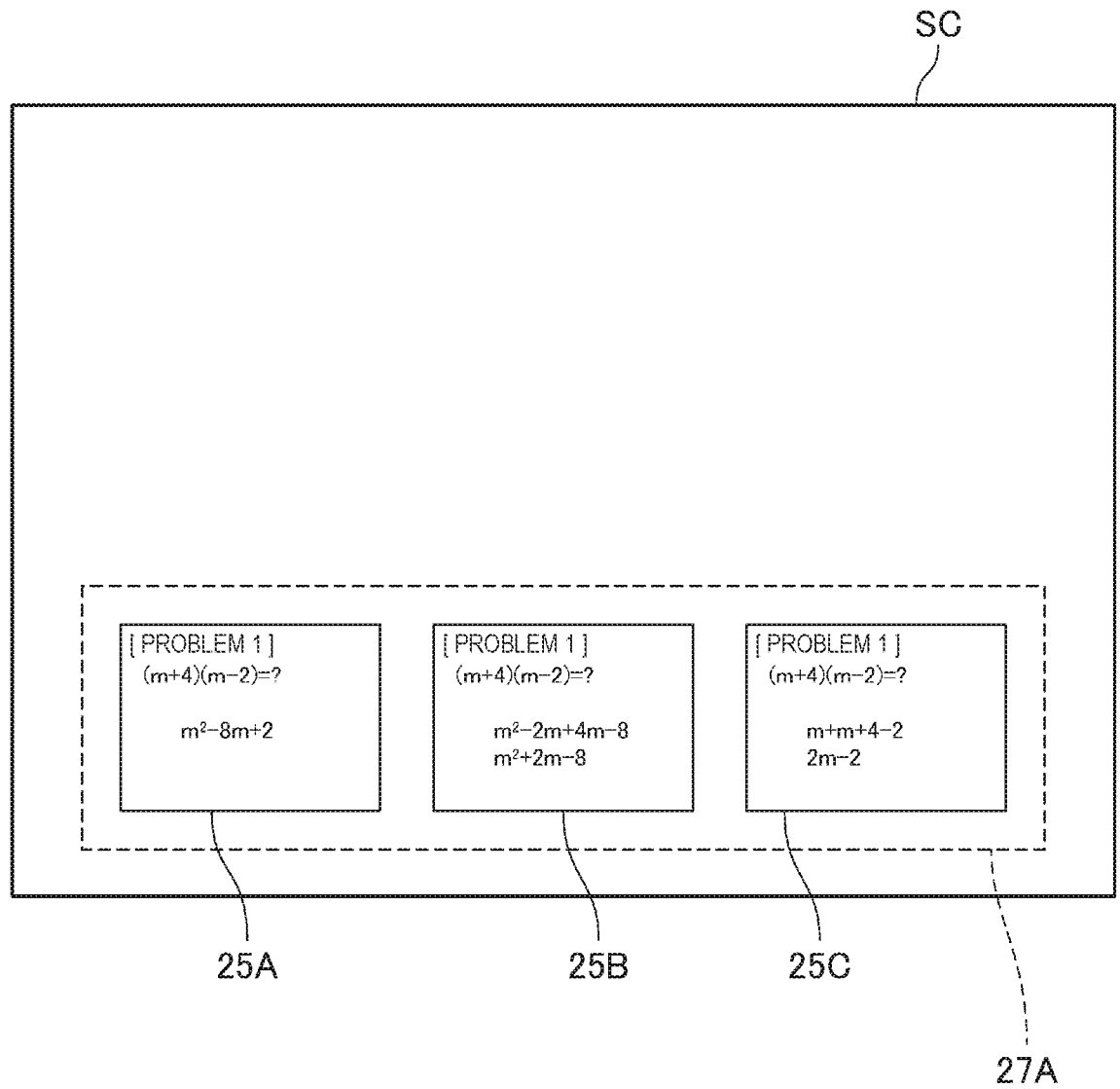
FIG. 15 is a diagram illustrating a display example of the projector.

FIG. 15 is a diagram illustrating a display example of the projector 100. In the example of FIG. 15, the display objects 25A, 25B, and 25C are disposed in a disposition region 27A disposed in a lower portion of the projection region 10 of the screen SC. The size and position of the disposition region 27A can be included in the preset setting data 62 (see FIG. 4).

Figure 16:
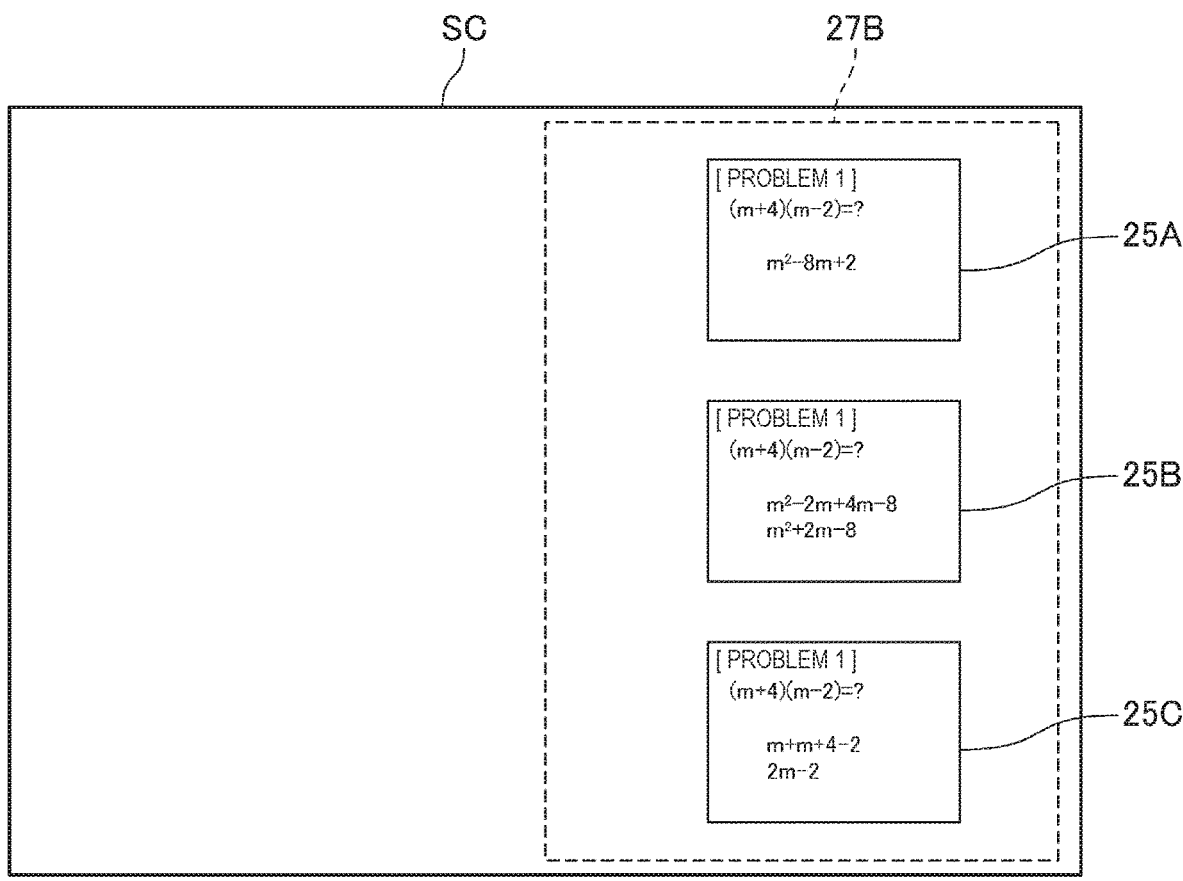
FIG. 16 is a diagram illustrating a display example of the projector.

In FIG. 16, the display objects 25A, 25B, and 25C are disposed in a disposition region 27B disposed on the right side of the region. The size and position of a disposition region are not limited to the examples of the disposition regions 27A and 27B, but any size and position can be set.

As described above, the projector 100 according to an embodiment to which the invention is applied includes the projection unit 20 that displays an image on the screen SC and the control unit 30 that causes the projection unit 20 to display the image on the screen SC based on the content data 63. The projector 100 further includes the object processing unit 34 that generates a display object and the storage unit 60. The control unit 30 combines the display object generated by the object processing unit 34 with the image displayed on the screen SC based on the content data 63 to display the display object. The control unit 30 stores the first display data 601 which is data of the image displayed based on the content data 63 by the projection unit 20 in the storage unit 60. The control unit 30 also stores the second display data 602 which is data of the image in which the display object is combined with the image of the first display data 601 in the storage unit 60 in association with the first display data 601. Thus, the projector 100 stores the image displayed based on the content data 63 as the first display data 601 and the image displayed by combining the display object with the displayed image as the second display data 602. Accordingly, the projector 100 can easily reproduce a state in which the content data 63 is displayed. The projector 100 can easily reproduce a state in which the display object is combined and displayed and a state in which no display object is combined.

For example, in a state in which a part of the content data 63 is cut as the display data 611 and an image based on the display data 611 is displayed, the display object 621A (see FIG. 7) can be generated and displayed in response to an operation received by the input detection unit 32. In this case, the data of the image in the state before the combination of the display object 621A is stored as the first display data 601A (see FIG. 5) in the storage unit 60. Therefore, by displaying an image based on the first display data 601A, it is possible to easily reproduce the state before the combination of the display object 621A. Since the data of the image with which the display object 621A is combined is stored as the second display data 602A, it is possible to easily reproduce the image.

The control unit 30 generates the first display data 601 corresponding to an image equivalent to one surface displayed on the screen SC by the projection unit 20 and the second display data 602. For example, in the frame memory 41, the data of the image drawn in a region corresponding to the projection region 10 may be set as the first display data 601 and the second display data 602. Thus, it is possible to easily reproduce a display state of the content data 63 using the data of the image equivalent to one surface displayed on the screen SC by the projector 100.

When an image is displayed based on the content data 63 by the projection unit 20, the control unit 30 generates the first display data 601 and stores the first display data 601 in the storage unit 60. That is, the projector 100 stores the data of the image in the state before combination or the like of the display object is performed, as the first display data 601. Therefore, it is possible to easily reproduce the display state of the content data 63 before the combination or the like of the display object is performed. In regard to the content data 63 displayed by the projector 100, the first display data 601 can be stored without omission. That is, the first display data 601 corresponding to a displayed part of the content data 63 is stored. Therefore, by reading and displaying the first display data 601, it is possible to easily reproduce the display. In this operation, information regarding the size or position of a region cut as the display data 611 in regard to the content data 63 is not necessary.

When the display object generated by the object processing unit 34 is combined with the content data 63 to be displayed, the control unit 30 generates the first display data 601 and the second display data 602 and stores the first display data 601 and the second display data 602 in the storage unit 60. That is, when the display object is combined with the image based on the content data 63 to be displayed, the projector 100 generates the first display data 601 in the state in which no display object is combined and the second display data 602 in the state in which the display object is combined. Therefore, in regard to the content data 63 displayed by the projector 100, the first display data 601 and the second display data 602 can be stored without omission, and thus it is possible to easily reproduce the display state of the content data 63.

When an instruction not to display the display object generated by the object processing unit 34 is input, the control unit 30 causes the projection unit 20 to display an image based on the first display data 601 stored in the storage unit 60. Thus, the projector 100 can efficiently perform the process of not displaying the display object using the first display data 601.

The storage unit 60 may be configured to be able to store the plurality pieces of second display data 602 in association with one piece of first display data 601. In this case, for example, the projector 100 can store the plurality of pieces of second display data 602 corresponding to a plurality of other display objects, and thus can reproduce a display state in which the plurality of other display objects are switched and combined in regard to one piece of content data 63.

In a state in which an image based on the first display data 601 or the second display data 602 stored in the storage unit 60 is displayed by the projection unit 20, the control unit 30 may combine an image based on the first display data 601 or the second display data 602 as a display object to display the image. In this case, the projector 100 can combine the first image data and the second image data as a display object with another image to display the first image data and the second image data. Thus, it is possible to reproduce the display state of the content data 63 in various forms.

The control unit 30 may cut a part of the content data 63 and cause the projection unit 20 to display an image based on the cut content data 63. In this case, it is possible to easily reproduce a display state in which the projector 100 displays the part of the content data 63. Therefore, when content of the content data 63 is larger than the range which can be displayed on the screen SC, the display state of the content data 63 can be reproduced without performing a work of specifying a displayed range.

The projector 100 may include the input detection unit 32 that detects an operation. The object processing unit 34 may generate a display object in response to an operation detected by the input detection unit 32. In this case, it is possible to generate the display object in response to the operation and combine the display object with the image based on the content data 63 to display the display object.

The projector 100 includes the position detection unit 50 that detects a position instruction operation. The input detection unit 32 acquires an instruction position of the position instruction operation detected by the position detection unit 50. The object processing unit 34 generates a display object based on the instruction position acquired by the input detection unit 32. Thus, it is possible to generate the display object in accordance with the position instruction operation and combine the display object with the image based on the content data 63 to display the display object.

The projector 100 includes the projection unit 20 that displays an image by projecting image light to the screen SC. The position detection unit 50 detects a position instruction operation in the projection region 10 to which the projection unit 20 projects the image light. Thus, the projector projecting the image light to the screen SC can display an image based on the content data 63, detect a position instruction operation in the projection region 10, and generate a display object to display the display object. It is possible to easily reproduce the display state of the content data 63 displayed by the projector.

The above-described embodiment and modification examples are merely examples of specific aspects to which the invention is applied and do not limit the invention. The invention can also be applied as other aspects. For example, the instructor used to operate the projection region 10 is not limited to the pen-type instructor 70. A finger of a user, a laser pointer, an instruction rod, or the like may be used and the shape or size thereof is not limited.

In the foregoing embodiment, the position detection unit 50 causes the photographing unit 51 to photograph the screen SC and specifies the position of the instructor 70, but the invention is not limited thereto. For example, the photographing unit 51 is not limited to the configuration in which the photographing unit 51 is installed in the body of the projector 100 and photographs a projection direction of the projection optical system 23. The photographing unit 51 may be disposed as a separate body from the body of the projector 100 and the photographing unit 51 may perform photographing on a lateral side or a front surface of the screen SC. Further, the plurality of photographing units 51 may be disposed and detect an operation position of the target detection unit 54 based on photographic image data of the plurality of photographing units 51.

In the foregoing embodiment, the configuration has been described in which a synchronization signal is transmitted to the instructor 70 using an infrared signal emitted by the transmission unit 52 from the projector 100 to the instructor 70, but the synchronization signal is not limited to the infrared signal. For example, the synchronization signal may be transmitted through radio wave communication or ultrasonic radio communication.

In the above-described embodiment, the example has been described in which whether the front end portion 71 of the instructor 70 comes into contact with the screen SC is determined based on the lighting pattern of the transceiver unit 74, but the invention is not limited thereto. For example, whether the front end portion 71 of the instructor 70 is pressed against the screen SC may be determined based on an image of the instructor 70 and the front end portion 71 shown in the photographic image data. This configuration can be realized, for example, by detecting the position of the front end portion 71 based on a plurality of pieces of photographic image data photographed in different directions and detecting an image of the front end portion 71 and an image of the shadow of the instructor 70 from the photographic image data.

In the above-described embodiment, the example has been described in which the operation of the instructor 70 is detected through the function of the position detection unit 50 contained in the projector 100, but the invention is not limited thereto. For example, the function of the position detection unit 50 can also be realized as an apparatus independent from the projector 100. A form can also be realized in which a display apparatus other than the projector 100 has the function of the position detection unit 50 and operates as a position detection apparatus.

The display apparatus according to the invention is not limited to the projector 100 that projects an image to the screen SC, as described above. Various display apparatuses such as a liquid crystal monitor or a liquid crystal television displaying an image on a liquid crystal display panel, a monitor apparatus or a television receiver displaying an image on a plasma display panel (PDP), and a spontaneous display apparatus such as a monitor apparatus or a television receiver displaying an image on an organic EL display panel called an organic light-emitting diode (OLED) or an organic electro-luminescence (OEL) are included in the display system according to the invention. In this case, the liquid crystal display panel, the plasma display panel, or the organic EL display panel is equivalent to a display unit and a display surface. The display surface is equivalent to the projection region 10 or an operation surface and an operation region operated with the instructor 70.

In the above-described embodiment, the example has been described in which the three transmissive liquid crystal panels corresponding to the colors of RGB are used as the light modulation device 22 modulating light emitted by the light source, but the invention is not limited thereto. For example, three reflective liquid crystal panels may be configured to be used or a scheme in which one liquid crystal panel and a color wheel are combined may be used. A scheme in which three digital mirror devices (DMDs) are used or a DMD scheme in which one digital mirror device and a color wheel are combined may be configured. When only one liquid crystal panel or DMD is used as the light modulation device 22, a member equivalent to a combination optical system such as a cross dichroic prism is not necessary. A light modulation device can also be adopted as well as the liquid crystal panel and the DMD as long as the light modulation device can modulate light emitted by the light source.

In the above-described embodiment, the projector 100 may stores the display object, instead of the second display date 602, in association with the first display data 601.

The functional blocks illustrated in the functional block diagrams of FIGS. 2, 3, and 4 illustrate functional configurations of the tablets 2 and 3 and the projector 100 and specific mounting forms are not limited. That is, it is not necessary to mount hardware corresponding to the functional blocks in the drawings and functions of a plurality of functional units can, of course, also be configured to realize functions of the plurality of functional units when one processor executes a program. Some of the functions realized by software in the foregoing embodiment may be realized by hardware or some of the functions realized by hardware may be realized by software.

Further, an external apparatus connectable to the projector 100 is not limited to the tablets 2 and 3. For example, an apparatus capable of outputting an image or audio, such as a desktop computer, a portable telephone including a smartphone, a video/music player, a tuner apparatus of television broadcast, may be used. A specific configuration of an interface connecting an external apparatus to the projector 100 is not limited. An interface can be applied without limit as long as the interface can transmit an analog image signal, an audio signal, or digital data. For example, a server apparatus connected to the tablets 2 and 3 and the projector 100 via communication lines may be installed. In this case, for example, the projector 100 may be configured to acquire the control program 61, the setting data 62, and the content data 63, and the like from the server apparatus. Alternatively, the projector 100 may be configured to transmit the first display data 601, the second display data 602, and the input terminal data 603 to the server apparatus so that the server apparatus stores the data. In this case, a different projector from the projector 100 or another type of display apparatus may be configured to download the first display data 601, the second display data 602, and the input terminal data 603 from the server apparatus and display the first display data 601, the second display data 602, and the input terminal data 603. In addition, a specific detailed configuration of the other units of an apparatus included in the display system 1 can also be changed arbitrarily in the scope of the invention without departing from the gist of the invention.

The invention may be embodied according to an aspect of a program performed by a computer to realize the method of controlling the above-described projector 100, a computer-readable recording medium that records the program, or a transmission medium that transmits the program. A magnetic or optical recording medium or a semiconductor memory device can be used as the recording medium. Specifically, a portable or fixed recording medium such as a flexible disc, a hard disk drive (HDD), a compact disk read only memory (CD-ROM), a digital versatile disk (DVD), a Blue-ray (registered trademark) disc, a magneto-optical disc, a flash memory, a card type recording medium can be exemplified. The recording medium may be a nonvolatile storage device such as a random access memory (RAM), a read-only memory (ROM), or an HDD which is an internal storage device included in each apparatus of the display system 1 or an external apparatus connected to each apparatus.

What is claimed is:

1. A display apparatus comprising:
    a display unit that displays a first image on a display surface;
    a control unit that causes the display unit to display the first image on the display surface;
    an object processing unit that generates a display object;
    a detection unit that detects an operation;
    a position detection unit that detects a position instruction operation; and
    a storage unit,
    wherein the control unit generates a second image by combining the display object generated by the object processing unit with the first image displayed on the display surface, and causes the display unit to display the second image,
    wherein the storage unit stores first display data which represents the first image displayed on the display unit,
    wherein the storage unit stores second display data which represents the second image in association with the first display data,
    wherein the object processing unit generates the display object in response to the operation detected by the detection unit,
    wherein the detection unit acquires an instruction position of the position instruction operation detected by the position detection unit, and
    wherein the object processing unit generates the display object based on the instruction position acquired by the detection unit.

2. The display apparatus according to claim 1,
    wherein the first display data and the second display data correspond to an image equivalent to one surface and displayed on the display surface by the display unit.

3. The display apparatus according to claim 1,
    wherein when the control unit causes the display unit to display the first image, the control unit stores the first display data in the storage unit.

4. The display apparatus according to claim 1,
    wherein when the control unit combines the display object generated by the object processing unit with the first image and causes the display unit to display the display object, the control unit stores the first display data and the second display data in the storage unit.

5. The display apparatus according to claim 1,
    wherein when an instruction not to display the display object generated by the object processing unit is input, the control unit causes the display unit to display an image based on the first display data stored in the storage unit.

6. The display apparatus according to claim 1,
    wherein the storage unit stores a plurality of pieces of the second display data in association with one piece of first display data.

7. The display apparatus according to claim 1,
    wherein in a state in which the control unit causes the display unit to display an image based on the first display data or the second display data stored in the storage unit, the control unit combines the image based on the first display data or the second display data as the display object and causes the display unit to display the display object.

8. The display apparatus according to claim 1,
    wherein the control unit cuts a part of content data and causes the display unit to display the first image based on the cut content data.

9. The display apparatus according to claim 1,
    wherein the display unit includes a projection unit displaying an image by projecting image light to the display surface, and
    wherein the position detection unit detects the position instruction operation in a projection region to which the projection unit projects the image light.

10. A display apparatus comprising:
    a display unit that displays a first image on a display surface;
    a control unit that causes the display unit to display the first image on the display surface;
    an object processing unit that generates a display object;
    a detection unit that detects an operation;
    a position detection unit that detects a position instruction operation; and
    a storage unit,
    wherein the control unit generates a second image by combining the display object generated by the object processing unit with the first image displayed on the display surface, and causes the display unit to display the second image,
    wherein the storage unit stores first display data which represents the first image displayed on the display unit,
    wherein the storage unit stores the display object in association with the first display data,
    wherein the object processing unit generates the display object in response to the operation detected by the detection unit, wherein the detection unit acquires an instruction position of the position instruction operation detected by the position detection unit, and wherein the object processing unit generates the display object based on the instruction position acquired by the detection unit.

11. The display apparatus according to claim 1, wherein, in the second image, the display object overlaps the first image.

* * * * *